US007720766B2

(12) United States Patent
Sakamoto

(10) Patent No.: US 7,720,766 B2
(45) Date of Patent: May 18, 2010

(54) DIGITAL DATA SELLING AND BUYING TRANSACTION SYSTEM, AUXILIARY DIGITAL DATA SELLING AND BUYING SYSTEM, DIGITAL DATA SELLING AND BUYING TRANSACTION METHOD, AUXILIARY DIGITAL DATA SELLING AND BUYING METHOD, AND DIGITAL DATA SELLING AND BUYING TRANSACTION APPARATUS

(75) Inventor: Tetsuhiro Sakamoto, Tokyo (JP)

(73) Assignee: Sony Corporation (JP)

( * ) Notice: Subject to any disclaimer, the term of this patent is extended or adjusted under 35 U.S.C. 154(b) by 12 days.

(21) Appl. No.: 12/077,474

(22) Filed: Mar. 19, 2008

(65) Prior Publication Data

US 2008/0183595 A1 Jul. 31, 2008

Related U.S. Application Data

(62) Division of application No. 10/019,794, filed as application No. PCT/JP01/03836 on May 8, 2001.

(30) Foreign Application Priority Data

May 8, 2000 (JP) ............................ P2000-134479

(51) Int. Cl.
*G06F 17/60* (2006.01)
(52) U.S. Cl. ............................ 705/57; 705/51; 705/59; 705/64; 726/27; 380/201; 380/262; 713/153
(58) Field of Classification Search ................ 705/1–79; 380/201, 262
See application file for complete search history.

(56) References Cited

U.S. PATENT DOCUMENTS 5,794,207 A * 8/1998 Walker et al. .................. 705/1

| 5,892,900 A | 4/1999 | Ginter et al. |
| 5,910,987 A * | 6/1999 | Ginter et al. ............ 705/52 |
| 6,337,911 B1 * | 1/2002 | Dillon ..................... 380/262 |

(Continued)

FOREIGN PATENT DOCUMENTS

JP 8-129590 5/1996

(Continued)

OTHER PUBLICATIONS

English Translation of Japanese Office Action issued on Jul. 7, 2009, issued in Japanese Patent Application No. 2001-583401.

(Continued)

*Primary Examiner*—Evens J Augustin
*Assistant Examiner*—Shahid Kamal
(74) *Attorney, Agent, or Firm*—Lerner, David, Littenberg, Krumholz & Mentlik, LLP

(57) ABSTRACT

Auxiliary digital data is sold and bought. A process for selling auxiliary digital data is performed with respect to a process for cancelling a limitation of use of the digital data. A process for buying the auxiliary digital data is performed. A process for receiving a selling request and a buying request is performed, and selling and buying transactions are concluded. The process of selling, the process of buying, and the process of selling and buying are each performed by transmitting and receiving data through a communication network.

10 Claims, 15 Drawing Sheets

U.S. PATENT DOCUMENTS

| | | | | |
|---|---|---|---|---|
| 6,463,153 | B1* | 10/2002 | Sako et al. | 380/201 |
| 6,587,827 | B1* | 7/2003 | Hennig et al. | 705/1 |
| 7,003,499 | B2* | 2/2006 | Arditti et al. | 705/67 |
| 7,120,609 | B1* | 10/2006 | Kerkdijk et al. | 705/78 |
| 7,165,045 | B1* | 1/2007 | Kim-E | 705/37 |
| 7,165,174 | B1* | 1/2007 | Ginter et al. | 713/153 |
| 7,346,583 | B2* | 3/2008 | Hicks et al. | 705/51 |
| 7,353,541 | B1* | 4/2008 | Ishibashi et al. | 726/26 |
| 2001/0016834 | A1* | 8/2001 | Yamanaka et al. | 705/40 |
| 2008/0016007 | A1 | 1/2008 | Erisman | |

FOREIGN PATENT DOCUMENTS

| | | |
|---|---|---|
| JP | 10-512074 | 11/1998 |
| JP | 10-320470 | 12/1998 |
| JP | 11-003387 | 1/1999 |

OTHER PUBLICATIONS

Shimizu, Ryosuke, et al. Information Selling Method by Web, The Information Processing Society of Japan No. 53 (1996) latter period) National convention pp. 3-398-3-390.

* cited by examiner

| VALUE | DESCRIPTION |
|---|---|
| 0 | EXPIRED |
| 1 | VALID IN VALIDATION PERIOD |
| 9 | NON EXPIRATION |

Fig. 8C

| VALUE | DESCRIPTION |
|---|---|
| 0 | EXPIRED |
| 1 | IN LIMIT PERIOD |
| 9 | NOT DESIGNATED |

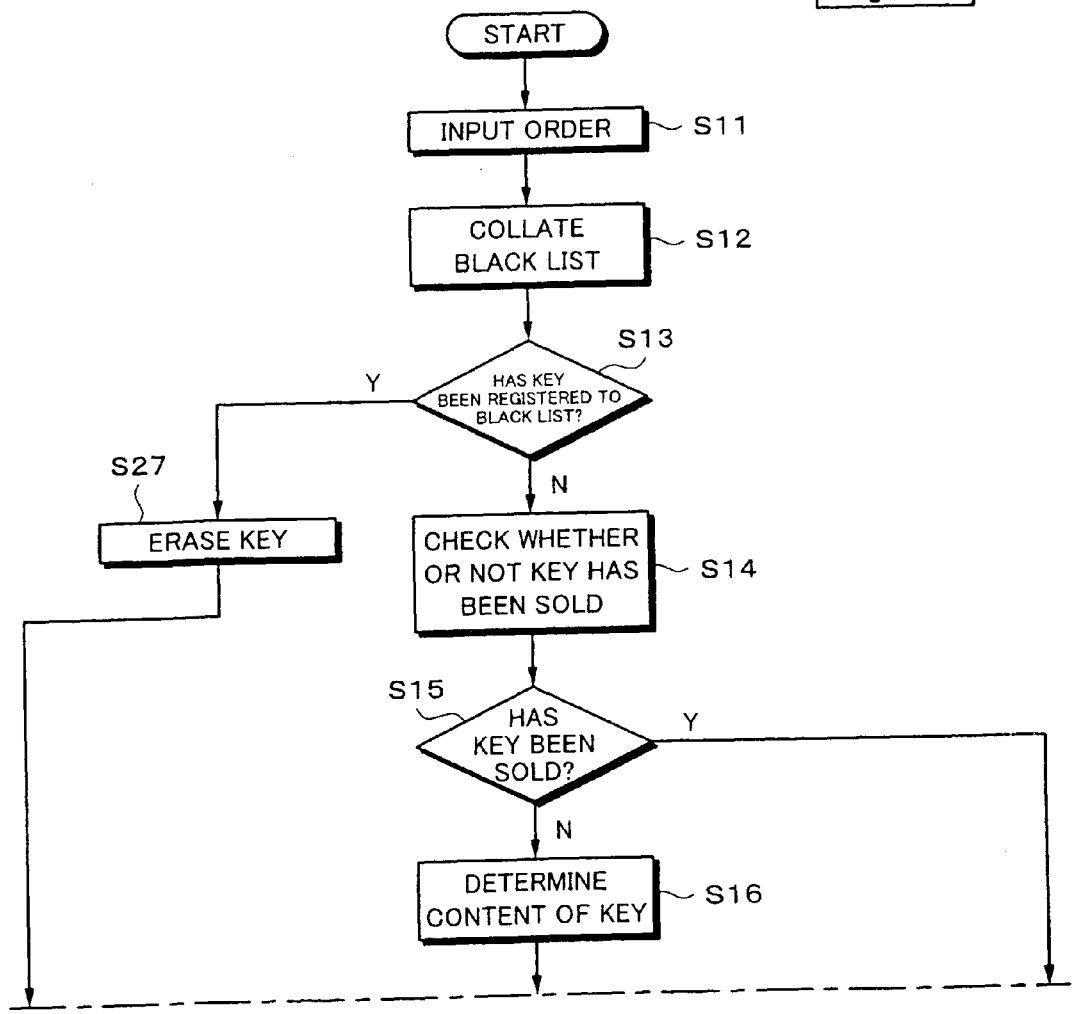

DIGITAL DATA SELLING AND BUYING TRANSACTION SYSTEM, AUXILIARY DIGITAL DATA SELLING AND BUYING SYSTEM, DIGITAL DATA SELLING AND BUYING TRANSACTION METHOD, AUXILIARY DIGITAL DATA SELLING AND BUYING METHOD, AND DIGITAL DATA SELLING AND BUYING TRANSACTION APPARATUS

CROSS-REFERENCE TO RELATED APPLICATIONS

This application is a divisional of U.S. application Ser. No. 10/019,794, filed Jun. 6, 2002, which is a national stage of International Application No. PCT/JP01/03836, filed May 8, 2001, which claims priority from Japanese Patent Application No. 2000-134479, filed on May 8, 2000, the disclosures of which are hereby incorporated by reference herein.

BACKGROUND OF THE INVENTION

1. Technical Field

The present invention relates to a digital data selling and buying transaction system, an auxiliary digital data buying and selling system, a digital data selling and buying transaction method, an auxiliary digital data selling and buying method, and a digital data selling and buying transaction apparatus for performing selling and buying transactions for digital data on a communication network using for example Internet or the like.

2. Background Art

In recent years, because of for example the deregulation of stock selling and buying commissions, so-called net trading using the Internet and so forth has been increasingly grown. It is stated that the foundation of NASDAC JAPAN will further contribute to allow the net trading to become common. Moreover, in addition to the sale of Play Station 2 (registered trademark), "e-Distribution" that is a full distributing service for digital data has been proposed.

As such a digital data distributing service using a communication network such as the Internet has become common, it is expected that the conventional distribution form will drastically change. For example, in a digital data distributing service, it is expected that the circulation cost, cost in progress, and so forth will not exist or they will be remarkably reduced. Thus, since the ratio of the development cost and advertisement cost to the selling price will largely increase, it is believed that uniformly standard prices will become meaningless.

At present, particularly as to music data, a digital data distribution business is being practically started. In such a distribution business, a buyer can buy his or her desired music data at a pre-designated distribution price. At present, the reasons why distribution prices have been designated relatively low are in that data that is distributed is compressed unlike with data that provided with a CD and that most of the development cost and advertisement cost can be collected from the sale of package mediums.

In future, non-compressed data for example data provided with a CD, a DVD, or the like will be able to be distributed. Thus, most of the development cost of digital data should be collected from the content distribution business. In such a situation, it will become difficult to keep the distribution prices low. As a result, it is predicted that the distribution price will rise.

In the present distribution business, systems that allow copyright to be protected have been proposed. However, systems that allow digital data of music data or the like that consumers bought to be freely resold have not been scarcely proposed. Thus, it is difficult to accomplish a distribution business that allows consumers to be protected. Such a situation results from the fact that since digital data provided with the distribution service is intangible information without using package mediums, it is restricted to sell and buy the digital data from a view point of copyright protection.

Thus, as to deciding the prices of digital data, it is important to consider how to accomplish a reselling system for digital data. Considering that in future contents are sold by distributing digital data, it is necessary to properly form a resale market. To do that, the conventional price determining system for digital data should be largely changed.

Therefore, an object of the present invention is to provide a digital data selling and buying transaction system, an auxiliary digital data selling and buying system, a digital data selling and buying transaction method, an auxiliary digital data selling and buying method, and a digital data selling and buying transaction apparatus that allow a proper transaction price to be decided on a communication network using for example the Internet and digital data to be sold (resold) and bought.

SUMMARY OF THE INVENTION

An aspect of the invention is a digital data selling and buying transaction system for performing selling and buying transactions for an encryption key for encrypted digital data among a plurality of terminal units connected through a communication network, comprising the processes of: receiving buying request data representing a buying order and a buying condition for the encryption key for the encrypted digital data, the buying request data being transmitted through the communication network; receiving selling request data representing a selling request and a selling condition for the encryption key for the encrypted digital data, the selling request data being transmitted trough the communication network; deciding a transaction price for the encryption key for the digital data corresponding to the received buying request data and selling request data for the encryption key; and concluding transactions of the buying request and the selling request corresponding to the decided transaction price.

Another aspect of the invention is an auxiliary digital data selling and buying system, comprising: a selling processing device for performing a process for selling auxiliary digital data with respect to a process for canceling the limitation of the use of digital data; a buying processing device for performing a process for buying the auxiliary digital data; and a selling and buying processing device for performing a process for receiving a selling request from the selling processing device and a buying request from the buying processing device and concluding selling and buying transactions, the selling processing device, the buying processing device, and the selling and buying processing device being connected through a communication network, wherein the selling processing device comprises: a transmitting means for transmitting user identification information and a selling request of a selling applicant of the auxiliary digital data through the communication network, a receiving means for receiving a selling notification for the digital data transmitted from the selling and buying processing device through the communication network, an erasing means having a function for erasing the auxiliary digital data, and a controlling means for controlling the transmitting means so that the user identification information and the selling request are transmitted to the selling and buying processing device and controlling the erasing means so that the auxiliary data is erased when the receiving means has received the selling notification transmitted from the selling and buying processing device through the communication network, wherein the buying processing device comprises: a transmitting means for transmitting user identification information and a buying request of a buying applicant of the auxiliary digital data through the communication network, a receiving means for receiving a buying notification of the digital data and/or the auxiliary digital data transmitted from the selling and buying processing device through the communication network, and a controlling means for controlling the transmitting means so that the user identification information and the buying request are transmitted to the selling and buying processing device through the communication network, and wherein the selling and buying processing device comprises: a receiving means for receiving the user identification information and the selling request transmitted from the selling processing device through the communication network and/or the user identification information and the buying request transmitted from the buying processing device through the communication network, a storing means for storing user management information and the auxiliary digital data, the user management information correlating the user identification information and information that represents the state of ownership of the auxiliary digital data and the digital data, a selling and buying transaction concluding processing means for concluding the selling and buying transactions of the auxiliary digital data corresponding to the user identification information and the selling request received by the receiving means from the selling processing device and the user identification information and the buying request received by the receiving means from the buying processing device, a transmitting means having a function for transmitting the auxiliary digital data and a selling notification thereof through the communication network, and a controlling means for performing a process for updating the user management information stored in the storing means corresponding to the user identification information of the selling applicant and/or the user identification information of the buying applicant received by the receiving means, a process for reading the auxiliary digital data to be transmitted from the storing means to the buying applicant, a process for controlling the transmitting means so that the auxiliary digital data that has been read to the buying processing device, and a process for controlling the transmitting means so that the selling notification is transmitted to the selling processing device, when the selling and buying transactions of the auxiliary digital data have been concluded.

Yet another aspect of the invention is a digital data selling and buying transaction method for performing selling and buying transactions for digital data through a wired or wireless communication network, comprising the steps of: receiving buyer side data that represents a buying order for digital data and a buying condition through the communication network; receiving seller side data that represents a selling order for digital data and a selling condition through the communication network; deciding a transaction price of the digital data corresponding to the number and contents of the buyer side data and the number and contents of the seller side data; and concluding the selling and buying transactions corresponding to the transaction price.

A further aspect of the invention is an auxiliary digital data selling and buying method, comprising the steps of performing a process for selling auxiliary digital data with respect to a process for canceling the limitation of the use of digital data; performing a process for buying the auxiliary digital data; and performing a process for receiving a selling request from the selling processing step and a buying request from the buying processing step and concluding selling and buying transactions, the selling processing step, the buying processing step, and the selling and buying processing step being performed by transmitting and receiving data through a communication network, wherein the selling processing step comprises the steps of: transmitting user identification information and a selling request of a selling applicant of the auxiliary digital data through the communication network, receiving a selling notification for the digital data transmitted from the selling and buying processing step through the communication network, having a function for erasing the auxiliary digital data, and controlling the transmitting step so that the user identification information and the selling request are transmitted to the selling and buying processing step and controlling the erasing step so that the auxiliary data is erased when the receiving step has received the selling notification transmitted from the selling and buying processing step through the communication network, wherein the buying processing step comprises the steps of: transmitting user identification information and a buying request of a buying applicant of the auxiliary digital data through the communication network, receiving a buying notification of the digital data and/or the auxiliary digital data transmitted from the selling and buying processing step through the communication network, and controlling the transmitting step so that the user identification information and the buying request are transmitted to the selling and buying processing step through the communication network, and wherein the selling and buying processing step comprises the steps of: receiving the user identification information and the selling request transmitted from the selling processing step through the communication network and/or the user identification information and the buying request transmitted from the buying processing step through the communication network, storing user management information and the auxiliary digital data, the user management information correlating the user identification information and information that represents the state of ownership of the auxiliary digital data and the digital data, concluding the selling and buying transactions of the auxiliary digital data corresponding to the user identification information and the selling request received by the receiving step from the selling processing step and the user identification information and the buying request received by the receiving step from the buying processing step, having a function for transmitting the auxiliary digital data and a selling notification thereof through the communication network, and performing a process for updating the user management information stored in the storing step corresponding to the user identification information of the selling applicant and/or the user identification information of the buying applicant received by the receiving step, a process for reading the auxiliary digital data to be transmitted from the storing step to the buying applicant, a process for controlling the transmitting step so that the auxiliary digital data that has been read to the buying processing step, and a process for controlling the transmitting step so that the selling notification is transmitted to the selling processing step, when the selling and buying transactions of the auxiliary digital data have been concluded.

A still further aspect of the invention is a digital data selling and buying transaction apparatus for performing selling and buying transactions for an encryption key for encrypted digital data among a plurality of terminal units connected through a communication network, comprising: a first receiving means for receiving buying request data that represents a buying order and a buying condition for an encryption key for encrypted digital data from a buying requesting device through the communication network; a second receiving means for receiving selling request data that represents a selling order and a selling condition for an encryption key for encrypted digital data from a selling requesting device through the communication network; a transaction condition determining means for determining whether or not transactions are concluded with the transaction conditions for the encryption key for the digital data corresponding to the buying request data for the encryption key and the selling request data for the encryption key; and a key movement controlling means for controlling the movement of the encryption key for the digital data from the selling requesting device to the buying requesting device corresponding to the concluded transactions determined by the transaction condition determining means.

BRIEF DESCRIPTION OF THE DRAWINGS

FIGS. 8A, 8B, and 8C are schematic diagrams for explaining encryption key data.

FIGS. 10A and 10B are flow charts showing a process performed in the case that a selling request is issued to the server.

DETAILED DESCRIPTION

Best Modes for Carrying Out the Invention

Figure 1:
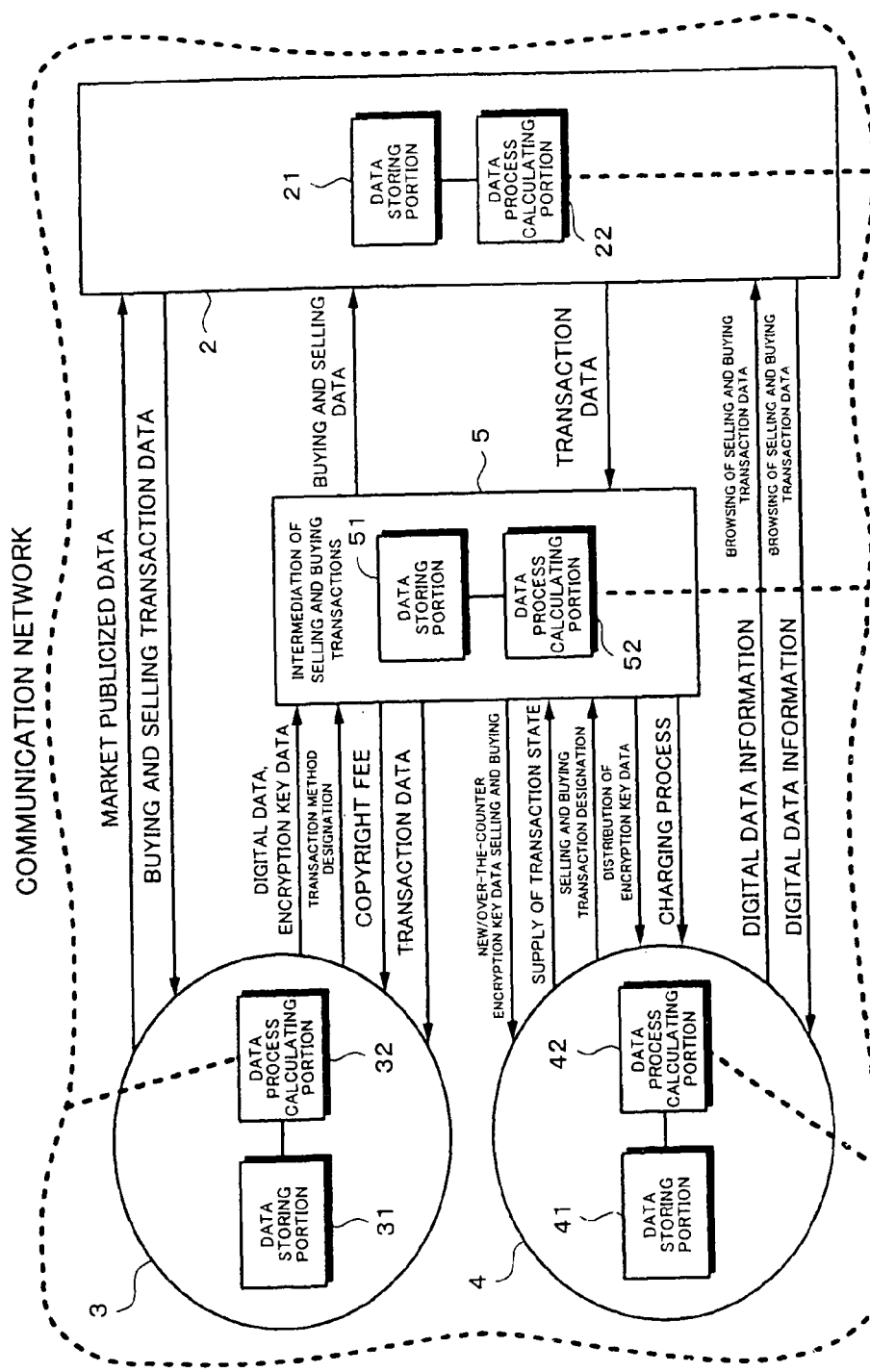
FIG. 1 is a block diagram for explaining an embodiment of the present invention.

FIG. 1 shows an example of the structure of a system according to an embodiment of the present invention. According to the embodiment of the present invention, an online digital data transaction managing portion 2 (hereinafter referred to as transaction managing portion 2), a digital data copyright owner 3, a digital data user 4, a transaction intermediary 5 are connected through a communication network using for example the Internet.

Generally, when digital data is provided to a user by for example distributing the digital data to him or her through the communication network, there is a risk of which the digital data is illegally copied. To protect the copyright of the digital data, a process such as an encrypting process is performed for the digital data so that even if it is copied, it cannot be used. In this case, when a user who legally bought digital data uses it, since the digital data has been encrypted, it is necessary to decrypt the encrypted digital data using auxiliary digital data such as encrypting key data for the digital data so as to remove the restriction of the use of the digital data.

In the state of which auxiliary digital data that cannot be copied is transferred, the right of use for digital data can be sold and bought. The right of use for digital data can be used for a device that uses copyright protecting technology. In the following description, phrases "buying, selling, selling and buying transactions, and so forth for digital data mean "buying, selling, selling and buying transactions, and so forth for the right of use of digital data, respectively.

The transaction managing portion 2 has a data storing portion 21 and a data process calculating portion 22. The data storing portion 21 is composed of for example a hard disk array, an optical disc library, or the like. The data storing portion 21 stores digital data as a transaction object of online digital data, encryption key data, chronological change of circulation number of encryption key data for each of digital data, chronological change of number of transactions, identification information and asset information of the transaction intermediary 5 who intermediates transactions, and the user 4, and so forth.

The data process calculating portion 22 perform processes for determining whether or not a transaction is settled corresponding to number of demanded digital data and number of supplied digital data supplied through the communication network, identification information and asset information of people concerned in the transaction, identification information of encryption key data, and so forth, distributing digital data and encryption key data, and/or a charging the people concerned in the transaction. In addition, the transaction managing portion 2 performs processes for managing information of all transactions performed through the communication network and publicizes all or part of transaction data on the network in real time.

The copyright owner 3 represents a person or an organization who (that) creates digital data (content) such as music, a picture, an image, a novel, and a game as a transaction object of digital data. In the specification, it is assumed that the copyright owner 3 includes a data process calculating portion 32, a data storing portion 31, and so forth. The data process calculating portion 32 creates digital data and key data. The data storing portion 31 is composed of a hard disk array, an optical disc array, or the like that stores and saves contents. Alternatively, the copyright owner 3 may create encryption key data for digital data that he or she created by himself or herself. Alternatively, the transaction intermediary 5 or the like who has obtained the right for selling digital data may create encryption key data.

The user 4 represents a person or an organization who (that) downloads digital data that the copyright owner 3 created through the communication network, buys encryption key data from the copyright owner 3 or the transaction intermediary 5 who created it, and is charged for the price thereof through the communication network. In addition, the user 4 can sell and buy encryption key data that he or she bought. In the specification, it is assumed that the user 4 includes a data process calculating portion 42, a data storing portion 41, and so forth. The data process calculating portion 42 uses digital data and key data. The data storing portion 41 is composed of a hard disk array, an optical disc library, or the like that stores and saves digital data.

The transaction intermediary 5 represents a person or an organization who (that) performs a process for creating and/or a process for managing encryption key data corresponding to digital data that the copyright owner 3 created, a process for selling encryption key data to the user 4 (namely, a process for concluding selling and buying transactions of encryption key data for digital data and for distributing the encryption key data), a process for charging the user 4 for the encryption key data and rewriting personal information, a process for checking the number of selling requests and/or the number of buying requests of encryption key data of users through the communication network, and a process for transferring selling and buying transaction data to the transaction market. Alternatively, the transaction intermediary 5 may intermediate to additionally issue encryption key data.

Generally, the transaction intermediary 5 is a person who has been permitted to perform the above-described processes by the supervisor or the like of the transaction managing portion 2. In the specification, it is assumed that the transaction intermediary 5 includes a data storing portion 51, a data process calculating portion 52, and so forth. The data storing portion 51 is composed of a hard disk array, an optical disc library, or the like that stores and saves digital data, encryption key data, selling and buying transaction data, personal information of people concerned in the transaction, and so forth. The data process calculating portion 52 performs a process for concluding transactions of digital data.

Next, selling and buying transactions for digital data according to the embodiment of the present invention will be described. First of all, transactions of digital data that is initially sold on the market will be described. The copyright owner 3 creates a required number of encryption key data for digital data A created by himself or herself so as to sell the digital data A on the market, decides the date and time on and at which he or she will sell the encryption key data, the number of encryption key data, the face value thereof, and so forth, and publicizes the seller side data including the decided contents on the communication network through the data transaction managing portion 2.

At that point, the transaction intermediary 5 is consigned for information necessary for selling the digital data A by the copyright owner 3. The transaction intermediary 5 may act on behalf of the copyright owner 3 for creating encryption key data and selling it. Alternatively, the copyright owner 3 may sell the right for selling a desired number of digital data to the transaction intermediary 5 in the lump. At that point, the transaction intermediary 5 who bought the right may sell the digital data at a price different from that at which the transaction intermediary 5 bought the right from the copyright owner 3.

The transaction managing portion 2 publicizes a home page on the communication network so as to allow the user to browse it with his or her browser. The copyright owner 3 publicizes on the home page (1) selling period, (2) number of selling digital data, and (3) market price (face value) for digital data that will be sold. Alternatively, the transaction intermediary 5 may publicize a home page that has such contents.

The user 4 obtains information about digital data that will be sold and that is publicized on the home page or the like. When the user 4 wants to buy the digital data, he or she performs processes necessary for buying the digital data. The processes include a process for inputting personal information of the user 4, a process for creating buyer side data such as conditions necessary for concluding a buying transaction, and a process for transmitting the buyer side data to the transaction managing portion 2. The conditions for concluding a buying transaction are for example "will be bought by an increase of 20% against the market price" and "will be bought by month m, day d".

The transaction intermediary 5 and/or the transaction managing portion 2 collects buying request information from a plurality of users 4 through the communication network. All the buying request information is collected to the transaction managing portion 2 through the communication network. The data process calculating portion 22 of the transaction managing portion 2 performs a process for concluding transactions corresponding to the buying request information, the number of encryption key data that will be sold, and the face price.

Next, an example of such processes will be described with reference to FIG. 2. In the example, it is assumed that the copyright owner 3 creates 100,000 encryption key data for the new digital data A and that he or she wants to sell each encryption key data at $30 as a market price on the market. In this case, if there are 150,000 buying applicants, the data process calculating portion 22 of the transaction managing portion 2 concludes the transactions in the order of higher buying prices of the buying applicants corresponding to buying transaction concluding conditions that have been input by the buying applicants.

Figure 2:
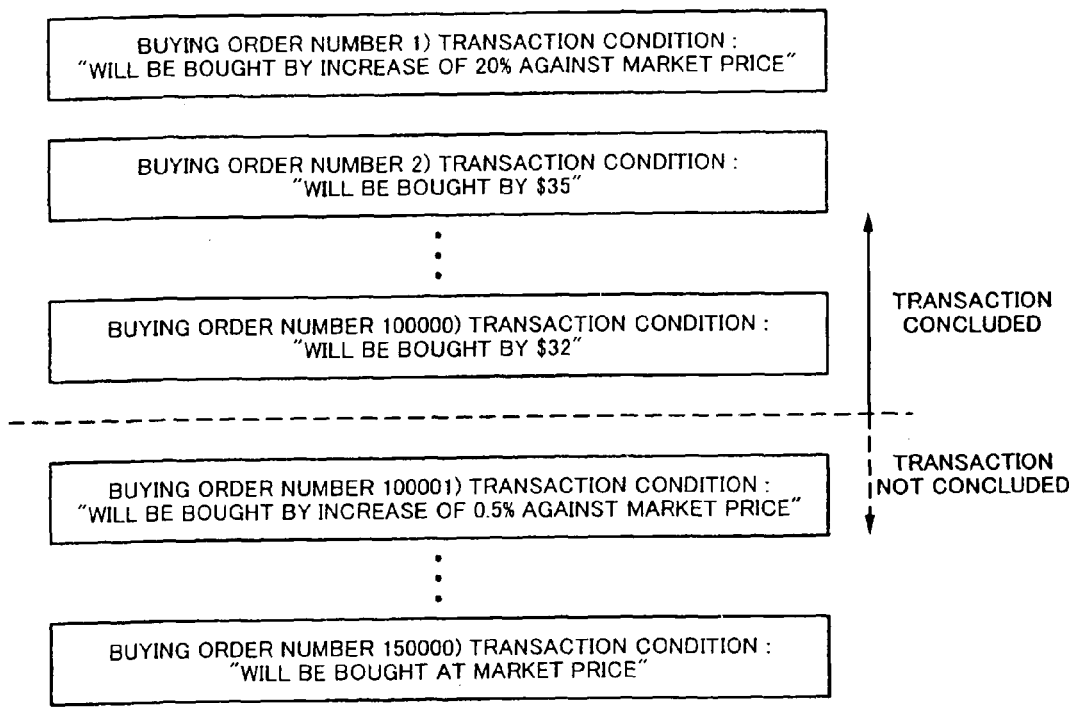
FIG. 2 is a schematic diagram for explaining an example of conclusion/unconclusion of selling and buying transactions according to the embodiment of the present invention.

When a 100,000-th transaction is concluded, if the transaction price is $32 as shown in FIG. 2, the initial price of the digital data A is $32. Thereafter, the copyright owner 3 can further sell a desired number of digital data A. At that point, the market price may not be $30. In addition, the copyright owner 3 may sell the digital data A to the users 4 at a privileged price when they are particular users who bought digital data that the copyright owner 3 created.

In addition, when the copyright owner 3 wants to quickly collect the development expense for digital data, he or she may sell the digital data to the transaction intermediary 5 in the lump (for example, 100,000 digital data). The transaction intermediary 5 may buy the selling right for 100,000 encryption key data at $28 per each and sell them at for example $30 as the market price. When the copyright owner 3 sells the digital data A on the market, if he or she determines that selling profit cannot be obtained because the number of buying applicants who will buy the digital data A is smaller than the number of encryption key data that he or she will sell, he or she can permit the transaction intermediary 5 and/or the transaction managing portion 2 to freely sell the digital data A on the market.

When digital data is sold and bought in the above-described manner, the profit of the copyright owner 3 can be effectively secured. In other words, by predicting the number of people of initial buying class (so-called mania class) of the users 4, the number of encryption key data to be sold and the face price thereof can be freely designated so that the maximum selling profit is obtained in a short time. In addition, corresponding to the transaction achievement of the first market sale, the number of encryption key data and the face price thereof can be freely designated for the second market sale. Alternatively, when the copyright owner 3 sells the selling right for a predetermined number of encryption key data in the lump, he or she can quickly collect the cost for the digital data.

Next, selling and buying transactions performed by the transaction managing portion 2 for digital data that has been sold and bought among a plurality of users 4 will be described. As to digital data that has been permitted to be freely sold and bought by that the copyright owner 3, the date on which the digital data can be freely sold and bought is publicized on a home page of the transaction intermediary 5 and/or the transaction managing portion 2. The users 4 who want to buy and sell such digital data perform processes necessary for selling and buying it. The processes include a process for inputting personal information and a process for inputting conditions necessary for concluding transactions. The conditions necessary for concluding transactions are for example a condition with respect to a transaction price such as "will be sold (bought) at $ D or higher (or lower)", a condition with respect to transaction date and time such as "will be sold (bought) by month m, day d", and a condition with respect to a trading settlement method such as "will be sold (bought) with money" or "will be substituted by selling digital data A and buying digital data B".

The transaction intermediary 5 or the transaction managing portion 2 collects selling or buying request information from a plurality of users through the communication network. Thus, all selling and buying request information on the communication network is collected to the transaction managing portion 2. The data process calculating portion 22 of the transaction managing portion 2 concludes transactions corresponding to the above-described selling and buying request information. Next, an example of such a process will be described with reference to FIG. 3. In the example, it is assumed that the number of selling applicants is five and the number of buying applicants is three.

In this case, selling order numbers are assigned to the five selling applicants in the order of lower selling prices. In contrast, buying order numbers are assigned to the three buying applicants in the order of higher buying prices. The transactions are concluded until either the number of buying applicants or the number of selling applicants becomes zero in the higher selling/buying order numbers. In other words, in the example shown in FIG. 3, since the number of buying applicants (namely, three people) is smaller than the number of selling applicants (namely, five people), the transactions are concluded until the number of selling applicants becomes 0.

Figure 4:
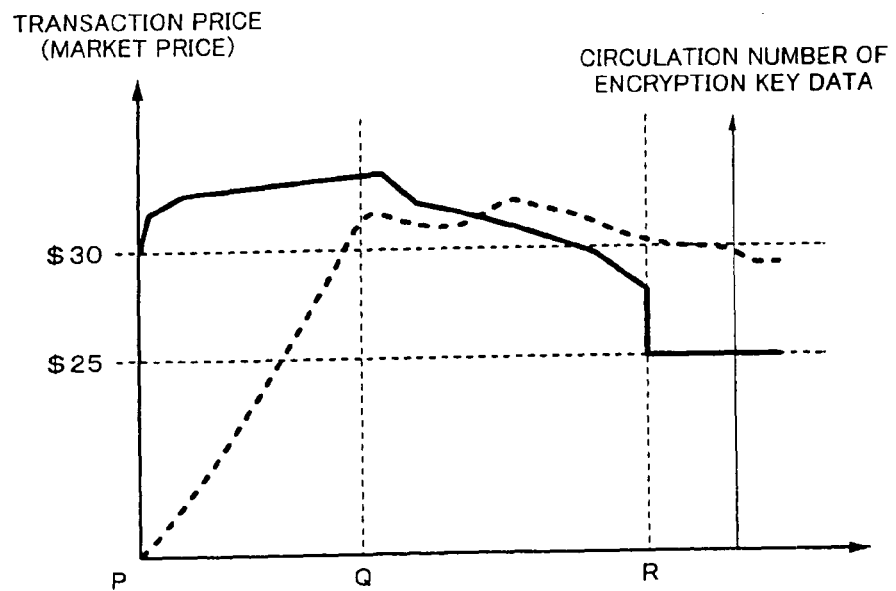
FIG. 4 is a schematic diagram for explaining a change of transaction form after placing digital data on the market.

Although such buying and selling transactions are concluded after the date of which digital data can be freely sold and bought, for example when the number of transactions decreases to a predetermined level, the copyright owner 3 can stop the buying and selling transactions on the transaction market. This point will be described with reference to FIG. 4. In FIG. 4, the horizontal axis represents time, whereas the vertical axis represents transaction price (market price) on the left side and circulation number of encryption key data on the right side (right side). The chronological change of transaction price is denoted by a solid line, whereas the chronological change of the circulation number of encryption key data is represented by a dotted line.

At the market publicized time P, the market selling price is designated at $30. Thereafter, both the transaction price and the circulation number of encryption key data increase. After time Q at which the encryption key data can be freely sold and bought, the price lowers. Thereafter, the circulation number of encryption key data does not change for a while. At time R, the circulation number of encryption key data largely decreases. Thus, the transaction price cannot be designated. As a result, the transactions are stopped. After the transactions are stopped, the encryption key data of the digital data can be sold and bought at an over-the-counter price designated by the copyright owner 3 or the transaction intermediary 5 between the copyright owner 3 or the transaction intermediary 5 and the users 4. In the example shown in FIG. 4, the over-the-counter price is designated at $25.

In the above-described selling and buying transactions for digital data, the profit of the users 4 can be secured as follows. First, the user 4 can sell digital data that they bought. Thus, a resale market is formed. Consequently, when the users 4 do not need to hold the right of use of digital data that they bought (because the digital data became old), they can sell the right of use so as to collect the cost that they spent.

In addition, when the users 4 sell the right of use of digital data that they recently bought, they can collect the cost that they spent for buying the right of use. In other words, it is thought that the earlier the users 4 sell the right of use of digital data, the more money they can collect. In addition, after the time Q at which digital data can be freely sold and bought, since the transaction price lowers, the users 4 can buy the digital data at a low cost.

When digital data is sold and bought, a predetermined percentage of transaction price or a predetermined price may be collected as a transaction commission by the transaction managing portion 2 or the transaction intermediary 5. Alternatively, a predetermined percentage of the buying price of the market transaction or a predetermined price may be collected as a copyright price as the profit of the copyright owner. In this case, when the transaction is concluded, the buying price does not always match the selling price as expressed by the following expression.

[buying price]=[selling price]+[transaction commission]+[copyright price]

In such a case, a copyright price corresponding to the number of transactions for digital data on the market (for example, several percent of the number of transactions) is paid to the copyright owner. Thus, even in the environment of the resale market, the profit of the copyright owner is secured.

Next, a practical scheme in which the user 4 buys digital data will be described. When the process necessary for the user 4 to buy digital data is completed, encryption key data and digital data are distributed from the data storing portion 21 of the transaction managing portion 2 or the data storing portion 51 of the transaction intermediary 5 to the user 4 through the communication network. The user 4 stores the transmitted data to the data storing portion 41. Thus, the user 4 can remove the restriction for the data (decrypt the encrypted data) and use the digital data.

When encryption key data and digital data are distributed to the user 4, a process for rewriting/storing seller/buyer information and management information of encryption key data is performed in the data storing portion 21 of the transaction managing portion 2 or the data storing portion 51 of the transaction intermediary 5. In addition, data for a charging process is transmitted to the user 4. As a practical example of the charging process, the data storing portion 2 of the transaction managing portion 2 or the transaction intermediary 5 accesses a managing server of a financial agency that manages the bank account of the user 4 and rewrites the asset information such as bank deposit balance of the user 4.

When the user 4 sells digital data, a process for selling digital data is performed. Thereafter, a process for erasing encryption key data that the user 4 has is performed. As such a process is performed, a process for rewriting/storing seller/buying information and management information of the encryption key data is performed in the data storing portion 21 of the transaction managing portion 2 or the data storing portion 51 of the transaction intermediary 5. The transaction managing portion 2 or the transaction intermediary 5 performs a process for paying the selling price to the user 4 through the communication network.

Figure 5:
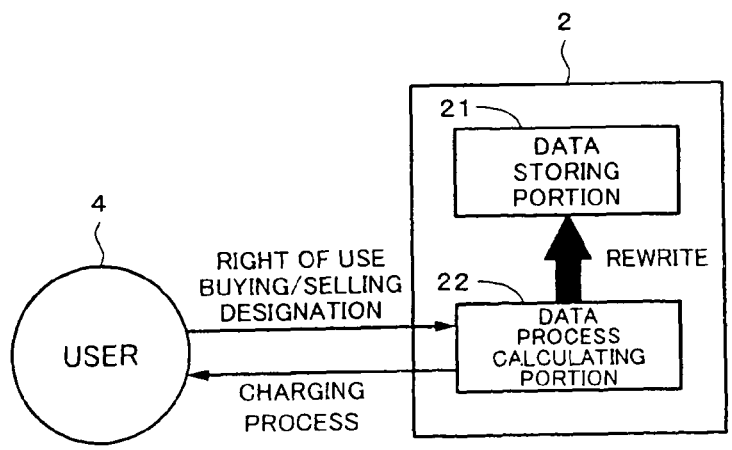
FIG. 5 is a schematic diagram for explaining practical selling and buying transactions of digital data.

Next, with reference to FIG. 5, an example of such a process will be described. The user 4 transmits to the data process calculating portion 22 of the transaction managing portion 2 data necessary for a process for buying or selling digital data. Corresponding to the transmitted data, the data process calculating portion 22 performs a process for determining whether the transaction is valid. Thereafter, the data process calculating portion 22 performs a process for transmitting or receiving encryption key data, a process for rewriting transaction data, management information of encryption key data, and so forth in the data storing portion 21, and so forth. Such processes may be performed by the transaction intermediary 5.

The digital data and encryption key data that have been obtained by the user 4 in such a manner can be moved from the data storing portion 41 of the user 4 to another storage medium for example a semiconductor memory, an optical disc, or the like that complies with encryption key technology. However, to prevent the digital data from being illegally copied, when it is moved from the data storing portion 41 to another storage medium, the encryption key data is erased from the storage medium.

Figure 6:
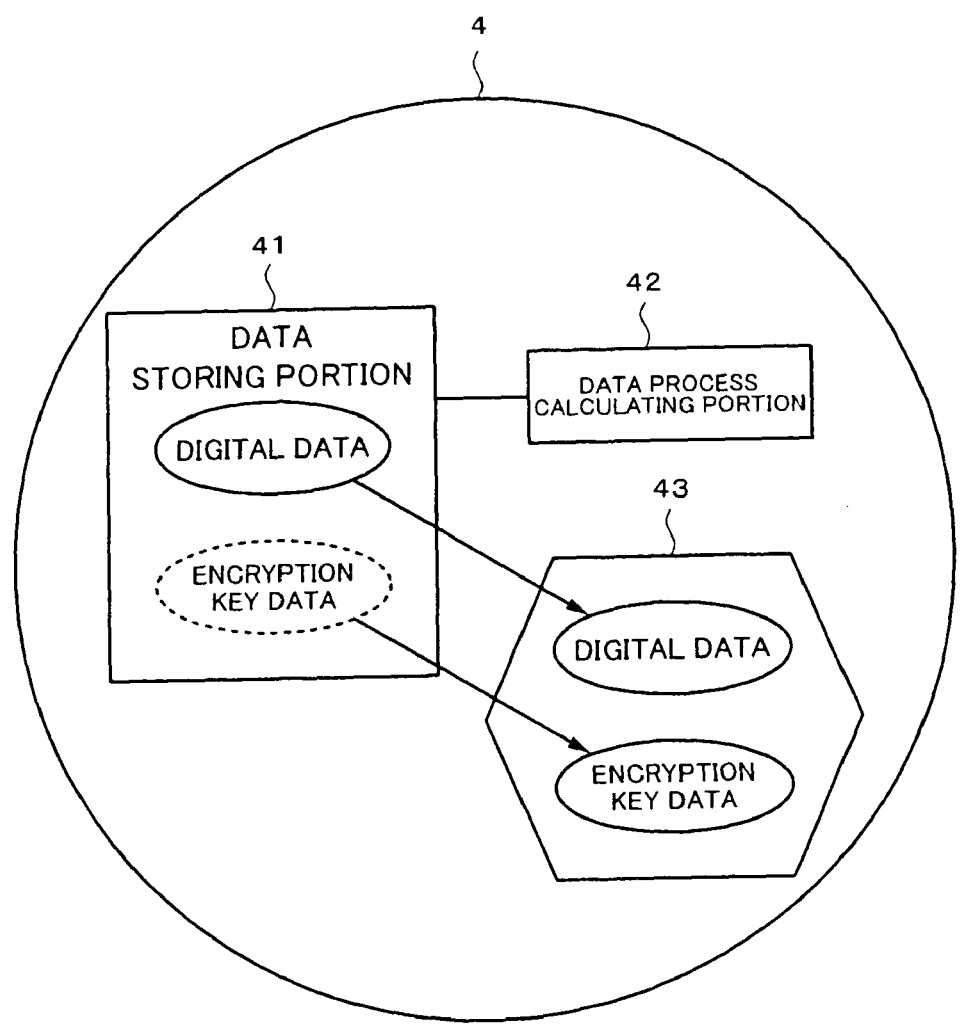
FIG. 6 is a schematic diagram for explaining a transfer of digital data that was bought.

In other words, when digital data is moved to a storage medium 42 other than the data storing portion 41, digital data (stored in the data storing portion 41) may be kept left as shown in FIG. 6. In contrast, when encryption key data is moved to the storage medium 42, encryption key data (stored in the data storing portion 41) is erased. When the storage medium 42 can be easily carried as a package medium, digital data can be circulated.

When the user 4 sells digital data, it is necessary to erase at least encryption key data or both digital data and encryption key data stored in the data storing portion 41 or the like. Thus, when the user 4 tries to sell encryption key data, it should be stored in a storing portion of a terminal unit connected to the communication network (for example, the data storing portion 41 of the user 4). When encryption key data is erased, a process for rewriting/storing seller/buyer information and management information of encryption key data in the data storing portion 21 of the transaction managing portion 2 or the data storing portion 51 of the transaction intermediary 5.

Figure 7:
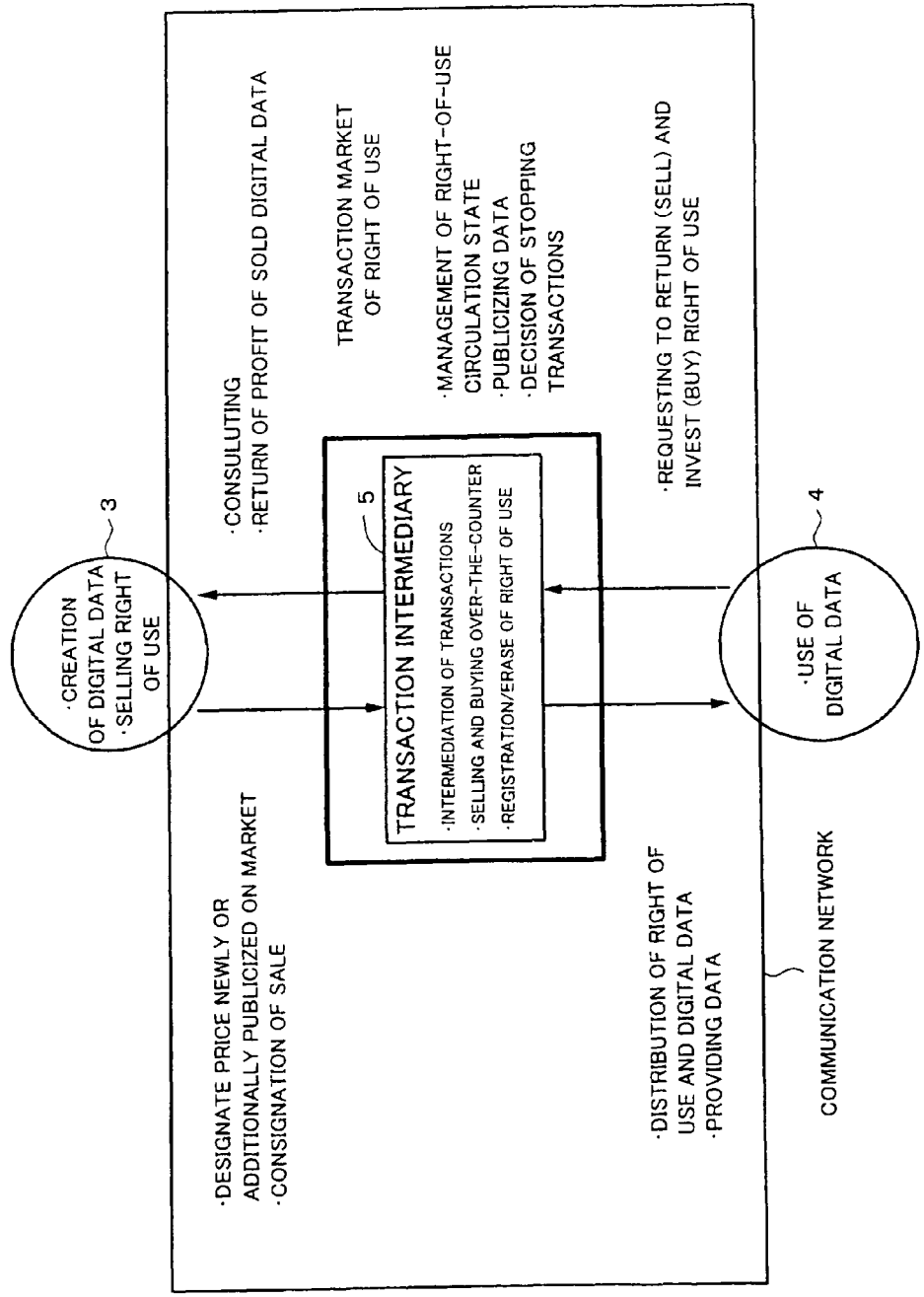
FIG. 7 is a schematic diagram showing an example of a digital data transaction market formed according to the embodiment of the present invention.

FIG. 7 shows an example of a transaction form performed according to the embodiment of the present invention. When the copyright owner 3, the user 4, and the transaction intermediary 5 are connected to the communication network, a market is formed. The copyright owner 3 creates digital data. The created digital data is placed on the market through the communication network. On the other hand, the user 4 buys the digital data and uses it. The transaction intermediary 5 performs (1) a process for intermediating transactions between the copyright owner 3 and the user 4, (2) a process for selling and buying digital data over-the-counter when the transactions are stopped, and (3) a process for registering and erasing the right of use of the digital data for the user 4 when the selling and buying transactions are concluded.

In addition, when the copyright owner 3 newly or additionally publicizes digital data to the transaction intermediary 5, the copyright owner 3 notifies the transaction intermediary 5 of the market price or consigns the digital data to the transaction intermediary 5. The transaction intermediary 5 consults for the copyright owner 3 about a selling condition and so forth. In addition, the transaction intermediary 5 returns the profit from sold digital data to the copyright owner 3. Moreover, the transaction intermediary 5 distributes digital data and corresponding encryption key data to the user 4 and provides information about the digital data to the user 4. The user 4 requests the transaction intermediary 5 to return (sell) the right of use of digital data to the user 4 and to invest (buy) the right of use of digital data.

Next, encryption key data as auxiliary digital data will be described in detail. FIG. 8 shows an example of encryption key data. A data portion 61 represents the type of encryption key data. A data portion 62 represents an ID number of a copyright owner 3. A data portion 63 represents a serial number that represents the type of a digital content. A data portion 64 represents a serial number of an encryption key. A data portion 65 represents a letter that represents other attribute. A data portion 66 represents an attribute of a validation period of an encryption key. A data portion 67 represents a validation period of an encryption key. A data portion 68 represents a limit period as a temporarily designated validation period of the validation period of the encryption key of the data portion 67.

In the example shown in FIG. 8, only data necessary for identifying encryption key data is contained. In real encryption key data, another data for determining whether or not digital data can be used corresponding to a calculation result using the digital data may be contained.

Next, the data portions 61 to 68 will be described in detail. The data portion 61 (type of encryption key data) represents, with respect to copying or moving encryption key data, whether encryption key data can be moved and copied one time; encryption key data can be moved only; or encryption key data can be neither copied nor moved. The data portion 62 (ID number of copyright owner) represents a number with which the copyright owner 3 who creates digital data is identified. The data portion 63 (serial number that represents type of digital content) identifies encryption key data for digital data of many types created by the copyright owner represented by the data portion 62. The data portion 64 (serial number of encryption key data) identifies encryption key data for digital data represented by the data portions 62 and 63. The data portion 65 (letter that represents other attribute) represents an encryption key copied from encryption key data that can be copied one time and the number of times the encryption key data has been sold and bought on the transaction market.

The data portion 67 (validation period of encryption key) represents the validation period in which digital data can be reproduced with an encryption key. The data portion 67 is composed of digits for a Christian year, digits for a month, and digits for a day. The data portion 68 (limit period) represents the limit period in which digital data can be reproduced with the encryption key in the validation period represented by the data portion 67. The data portion 66 (attribute of validation period) represents attributes of the data portion 67 (validation period) and the data portion 68 (limit period).

The high order digit of the period attribute data 66 ("1" in FIG. 8A) represents the attribute of the validation period data 67. The low order digit of the period attribute data 66 ("2" in FIG. 8A) represents the attribute of the time period data 68. The high order digit of the period attribute data 66 that represents the attribute of the validation period data 67 has values shown in FIG. 8B.

When the high order digit of the period attribute data 66 is "0", this state represents that regardless of whether or not the current date is before the expiration of the validation period represented by the validation period data 67, digital data using the encryption key is prohibited from being reproduced. This state is designated when the user has illegally used the encryption key or when the copyright owner of the digital data as a content has prohibited the digital data from being used regardless of the initial validation period of the digital data.

When the high order digit of the period attribute data 66 is "1", the state represents that digital data as a content can be reproduced with an encryption key in the period represented by the validation period data 67.

When the high order digit of the period attribute data 66 is "9", the state represents that content digital data can be reproduced with an encryption key regardless of the period represented by the validation period data 67.

When the low order digit of the period attribute data 66 is "9", this state represents that the limit period represented by the limit period data 68 is not counted. In this state, the date represented by the limit period data 68 is not used.

When the low order digit of the period attribute data 66 is "1", this state represents that the limit period represented by the limit period data 68 is being counted. In this state, in the limit period (as will be described later), the encryption key as the right of use of the content is placed on the market as a buying and selling object.

When the low order digit of the period attribute data 66 is "0", this state represents that the counting of the limit period represented by the limit period data 68 has been completed. This state is set after the encryption key is placed on the market, if the server that forms the market has not been accessed by the end of the limit period. In this state, until an operation for reflecting the result of selling and buying transactions is performed by accessing the server, the content digital data using the encryption key is prohibited from being used.

In the combination of the high order digit and the low order digit of the period attribute data 66, there are a plurality of states for an encryption key. For example, when the high order digit of the period attribute data 66 is "9" and when the low order digit of the period attribute data 66 is "9", a period for which content digital data using an encryption key can be reproduced has not been designated. Thus, in this state, the digital content data can be freely used in the range of the use limit other than the use period.

In addition, since the limit period has not been designated, a process with respect to the limit period is not performed. When the high order digit of the period attribute data 66 is "9" and the low order digit of the period attribute data 66 is "1", this state represents that since the use period for the encryption key is not limited, it can be used without the limit period. However, since this state represents that since the encryption key is placed on the market, the limit period data 68 is valid. When the content digital data is reproduced with the key, this state represents that it should be checked whether or not the limit period has elapsed so as to determine whether the content digital data can be reproduced.

When the high order digit of the period attribute data 66 is "9" and the low order digit of the period attribute data 66 is "0", this state represents that although the use period for the encryption key has not been designated, while the result of selling and buying transactions of the encryption key placed on the market is not affected to the encryption key, the limit period has elapsed. Thus, this state represents that content digital data using the encryption key is prohibited from being reproduced. In this state, as will be described later, when the state of the encryption key that is stored in the server that forms the transaction market is updated, the content digital data may become reproducible.

When the high order digit of the period attribute data 66 is "1" and the low order digit of the period attribute data 66 is "9", this state represents that the encryption key can be freely used in the range of the use limit until the end of the period represented by the validation period data 67 and that since the encryption key has not been placed on the transaction market, the period represented by the limit period data 68 is invalid. The above description applies to other combinations of the high order bit and the low order bit of the period attribute data 66.

The data portion 61 can be changed independent from the data portions 62, 63, and 64. For example, when the encryption key serial number 64 is in the range from 0000001 to 0001000, with respect to the data portion 61, encryption key data can be moved and copied one time. When the encryption key serial number 64 is after 0001000, with respect to the data portion 61, the encryption key data can be moved only.

The above-described encryption key data and encryption key data management data that represents the state of each thereof are stored in the data storing portion 21 of the transaction managing portion 2. The encryption key data management data represents the state of each encryption key data with respect to for example whether it has not been sold and bought on the market, it is managed by a particular user 4, and it is managed by the transaction intermediary 5 through selling and buying transactions on the transaction market.

When encryption key data is managed by the control of a particular user 4, it may be managed by the data storing portion 21 of the transaction managing portion 2. Alternatively, personal information of the user 4 may be correlated with the encryption key data management data. In this case, the personal information is separately obtained. For example, the encryption key data management data may contain an identification number of a user 4.

Next, the case of which a copyright owner 3 creates digital data, publicizes encryption key data to the transaction managing portion 2, and sells the encryption key data will be described. As a practical example, the case of which the copyright owner 3 whose copyright owner ID number is 0001 causes the transaction managing portion 2 to publicize 100,000 encryption key data for digital data whose serial number is 00100 and to sell them will be considered. In this case, it is assumed that encryption key data whose serial numbers are from 0000001 to 0010000 (namely, first 10,0000 encryption key data) are permitted to be moved and copied one time and that encryption key data whose serial numbers are from 0010001 to 0100000 (namely, the remaining 90,000 encryption key data) are permitted to be moved only.

In such a case, 10,000 encryption key data, P-0001-00100-0000001, P-0001-00100-0000002, . . . , and P-0001-00100-0010000 and 90,000 encryption key data Q-0001-00100-0010001, Q-0001-00100-0010002, . . . , and Q-0001-00100-01000000 are prepared. Those encryption key data and the encryption key data management data are stored in the data storing portion 21 of the transaction managing portion 2.

In the above-described practical example, "P" is a letter that represents the type of encryption key data that is permitted to be moved and copied one time, whereas "Q" is a letter that represents the type of encryption key data permitted to be moved only.

The form of the encryption key data is not limited to the above-described practical example. For example, the types of encryption key data with respect to whether or not they can be copied and moved may be letters other than "P" and "Q". Likewise, the effective numbers of digits of serial numbers and so forth are not limited to those used in the example. In addition, the data portion 65 (letter representing other attribute) may be preceded by a string for identifying encryption key data.

When the copyright owner 3 places the above-described 100,000 encryption key data on the market, he or she notifies the transaction managing portion 2 and the transaction intermediary 5 of market publicizing data that recites "100,000 encryption key data will be placed on the market at $30 as a market price at 0 AM on Mar. 30, 2001. Although all the encryption key data can be moved, the first 10,000 encryption key data can be also copied one time each". The transaction managing portion 2 or the transaction intermediary 5 publicizes the above-described market publicizing data at least on the communication network. When encryption key data is sold on the transaction market, a user 4 performs a buying process thereof. Corresponding to the buying process, the transaction managing portion 2 performs various processes corresponding to the buying process.

Among those processes, a transmitting process for transmitting encryption key data to a user, an updating process for updating a database for encryption key data in the data storing portion 21 of the transaction managing portion 2, and so forth will be described in detail. When selling and buying transactions of encryption key data are concluded, the encryption key data is transmitted to a user 4 who bought it. At that point, information of the data portion 65 (data of other attribute) is added to the encryption key data. Alternatively, the information of the data portion 65 is updated. The information of the other attribute is personal information of the user 4 such as the local area thereof, selling and buying transaction history of the encryption key data, the market publicized date, and so forth.

Although the encryption key data contains the above-described contents, a scrambling process or the like has been performed so that the encryption key data cannot be easily read. Thus, it is impossible for the third person to create false encryption key data.

When encryption key data is transmitted to a user 4, encryption key data management information, user management information, and so forth managed by the transaction managing portion 2 are rewritten. In other words, in the encryption key data management information, the attribute of each encryption key data (namely, the contents of the data portion 65) and so forth are added or updated. On the other hand, in the user management information, information that represents bought encryption key data and the attribute of the encryption key data is added or updated.

Next, the case of which encryption key data as auxiliary data is freely sold and bought on the transaction market will be described. As a practical example, the case of which the copyright owner ID number is 0001, the serial number is 00100, and the serial numbers of encryption key data that are circulated on the market are from 0000001 to 0100000 (namely, 100,000 encryption key data are freely sold and bought) will be considered. The transaction managing portion 2 frequently receives seller side data and buyer side data and manages them. The transaction managing portion 2 performs a determining process for determining whether the transactions are concluded corresponding to transaction request conditions contained in the seller side data and buyer side data, user asset information obtained from user management information, attributes of encryption key data contained in encryption key data management information, and so forth.

When the transaction managing portion 2 concludes a transaction, the transaction managing portion 2 performs a process for identifying encryption key data that a user 4 who will sell the encryption key data in the transaction (hereinafter, this user 4 is referred to as selling user 4) has corresponding to user identification information and user management information of the selling user 4. Thereafter, the transaction managing portion 2 updates the encryption key data management information. In addition, the transaction managing portion 2 controls (or issues a command for) a process for erasing encryption key data stored in a selling processing device of the selling user 4. In addition, corresponding to the price that the selling user 4 will obtain from the transaction, the transaction managing portion 2 rewrites and/or transmits data necessary for updating the asset information of the selling user 4.

In addition, corresponding to user identification information and user management information of a user 4 who will buy the encryption key data in the transaction (hereinafter, this user 4 is referred to as buying user 4), attribute data equivalent to the data portion 65 of the encryption key data obtained from the selling user 4 is updated. After a scrambling process is newly performed for the encryption key data, the scrambled encryption key data is transmitted to the buying user 4. In addition, the encryption key data management information is updated. Corresponding to the price that the buying user 4 should pay in the transaction, data necessary for updating asset information of the buying user 4 is rewritten and/or transmitted.

At that point, a trading transaction may be performed between encryption key data for first digital data and encryption key data for second digital data. Next, such a transaction will be described. As a practical example, the case of which there are a user 4a who wants to sell digital data A, a user 4b who wants to buy digital data B, and a user 4c who wants to buy the digital data A and sell the digital data B is considered. In this case, the user 4c will pay the price for buying the digital data A and receives the price for selling the digital data B. In this case, these two transactions may be performed separately or simultaneously.

In other words, the transaction managing portion 2 calculates the transfer of the asset that takes place when the transaction that the user 4c wants (namely, a trade between A and B) is concluded. In addition, the transaction managing portion 2 simultaneously performs a process for erasing encryption key data a for A and a process for transmitting encryption key data b for B for the user 4c. Thus, the transaction managing portion 2 calculates the changed asset information of the user 4c that takes place in the two transactions and updates the asset information corresponding to the calculated result.

Digital data may be changed with respect to each encryption key data (as method (a)). Alternatively, digital data may be changed with respect to all encryption key data (as method (b)). In the method (a), each digital data corresponds to each encryption key data in the relation of one to one. As a practical example of the method (a), each encryption key data A-0001-00100- . . . and so forth is scrambled. As a practical example of the method (b), all encryption key data A-0001-00100-0000001 to A-0001-00100-0100000 are scrambled. In any method, when digital data is transmitted to the user 4, the use thereof is limited. Only when a process using proper encryption key data is performed, the limitation is removed.

Next, a process for determining whether or not a transaction is concluded and a process for deciding a transaction price will be described in detail. When the transaction managing portion 2 receives seller side data and buyer side data, the transaction managing portion 2 reads user management information corresponding to user identification information of a user 4 who is concerned in the transaction. Information contained in the seller side data and the buyer side data is (p) dates and times on and at which the transaction managing portion received the seller side data and the buyer side data, (q) price conditions (upper limit value and lower limit value) in the selling and buying transactions, and (r) transaction conclusion request dates and times (for example, a period from May 1 to May 31).

When the transaction prices are decided corresponding to such information, an official selling price and an official buying price are decided in consideration of a commission, other fees, and so forth corresponding to the decided transaction prices. With respect to each price, in consideration of the relation of the buying price and the asset information of the user 4 who wants to buy the encryption key data, as long as no inconsistency takes place, the transactions are concluded. Inconsistency takes place when the asset information is changed corresponding to the buying price, if an asset management condition (for example, the bank account can be maintained when the balance exceeds a predetermined value) of the asset information managing portion that manages the bank account of the user 4 who wants to buy the encryption key data (the asset information managing portion is for example a bank account of the user 4 or an account of the user 4 on the transaction managing portion 2) cannot be satisfied (for example, the balance becomes minus).

The transaction prices are decided in at least three cases: (s) a price at which the copyright owner places encryption key data on the market; (t) a selling price in free selling and buying transactions; and (u) a barter trade in free selling and buying transactions. To designate the transaction prices, as necessary information, there are (x) contents of seller side data/buyer side data (reception dates and times, price conditions, transaction conclusion request dates and times, and so forth of the transaction managing portion 2); and (y) number of seller side data/number of buyer side data necessary for the transactions and number of digital data/auxiliary digital data (number of demands/number of supplies).

When necessary, the chronological change of past transaction prices may be contained in information necessary for designating transaction prices. Corresponding to the information necessary for designating the transaction prices in a predetermined time period or in each unit time, the transaction prices are decided. As to the buyer side data and the seller side data, when the contents of a plurality of selling requests/buying requests are similar (in price conditions, transaction dates and times, or the like), the transaction priority is decided corresponding to the reception dates and times of the requests received by the transaction managing portion 2.

Next, the case (s) will be descried in detail. In this case, while a predetermined number of encryption key data are prepared and supplied on a predetermined date, the transaction prices are decided corresponding to buying requests of users 4 (namely, corresponding to a plurality of buyer side data). For example, before encryption key data is publicized, buyer side data collected before the publicized date (namely, received by the transaction managing portion 2) is arranged in the order of higher buying prices. When the number of buyer side data is larger than the number of encryption key data that are placed on the market, the buying price of buyer side data that matches the number of encryption key data placed on the market becomes a transaction price.

On the other hand, when the number of buyer side data is smaller than the number of encryption key data that are placed on the market, the buying price of buyer side data corresponding to the lowest buying order or the publicized price of encryption key data becomes an initial transaction price. As to the remaining encryption key data, corresponding to the contents and the number of buyer side data in each unit time after the publicized date, the transaction price is decided in the above described manner. In any case, the transaction price is designated in consideration of a commission and so forth.

Next, the case (t) will be described in detail. In this case, corresponding to the contents and the number of buyer side data and seller side data in each unit time, the transaction price is decided. In this case, the transaction price should be designated in consideration of a commission, copyright right of use, and so forth.

Next, the case (u) will be described in detail. In this case, transactions of which a plurality of encryption key data are sold and bought at the same time is performed. In this case, the same price deciding method as the case (t) is used. However, it is necessary to change a commission and so forth in the barter trade.

Figure 9:
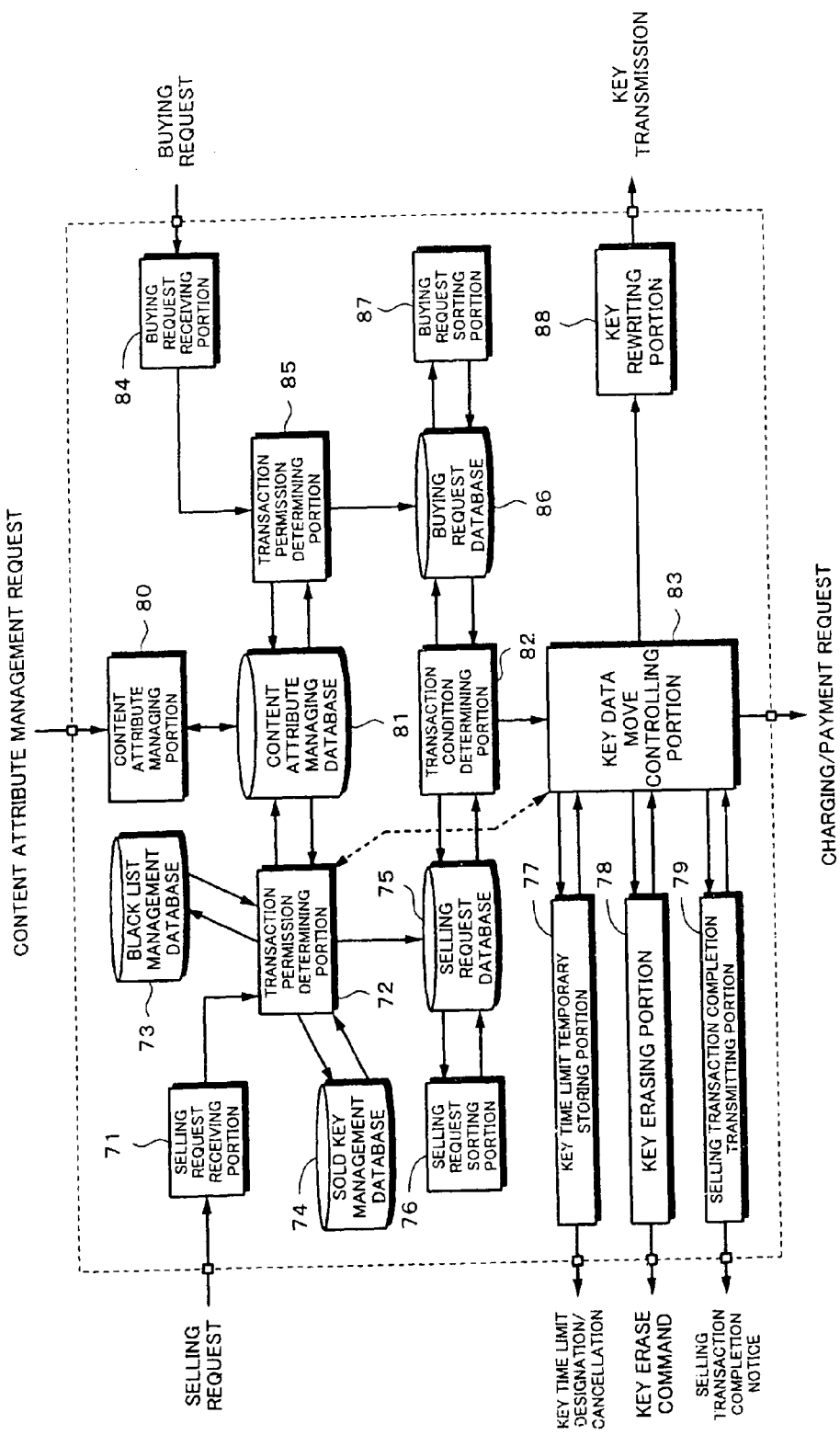
FIG. 9 is a block diagram showing an example of the structure of a server side.

Next, the embodiment of the present invention will be described more practically. FIG. 9 shows a more practical structure of a server side (transaction managing portion 2 or transaction intermediary 5) according to the embodiment.

A selling request of a user is received by a selling request receiving portion 71 and supplied to a transaction permission determining portion 72. The transaction permission determining portion 72 references a black list management database 73, a sold key management database 74, and a content attribute management database 81 and determines whether or not the selling request is valid The content attribute management database 81 is managed by a content attribute managing portion 80. A content attribute management request is supplied to the content attribute managing portion 80.

The selling request permitted by the transaction permission determining portion 72 is stored in a selling request database 75. The selling request database 75 is sorted by a selling request sorting portion 76.

On the other hand, a buying request of a user is supplied to a transaction permission determining portion 85 through a buying request receiving portion 84. The transaction permission determining portion 85 references the content attribute management database 81 and determines whether or not the buying request is valid.

The buying request permitted by the transaction permission determining portion 85 is stored in a buying request database 86. The buying request database 86 is sorted by a buying request sorting portion 87.

A transaction condition determining portion 82 checks the selling request stored in the selling request database 75 and the buying request stored in the buying request database 86 and determines whether or not transactions are concluded. Transaction data that is output from the transaction condition determining portion 82 is supplied to a key data move controlling portion 83.

The key data move controlling portion 83 moves key data from a seller to a buyer corresponding to the transaction data that is output from the transaction condition determining portion 82. The key data move controlling portion 83 settles a buying price. The key data move controlling portion 83 controls a key rewriting portion 88 and transmits the rewritten key to the buyer.

In addition, the server side is provided with a key time limit temporary managing portion 77, a key erasing portion 78, and a selling transaction completion transmitting portion 79 that are controlled by the key data move controlling portion 83. The key time limit temporary managing portion 77 designates and cancels key time limit. The key erasing portion 78 generates a key erase command. The selling transaction completion transmitting portion 79 outputs a selling transaction completion notice.

An owner of a content such as a copyright owner can designate a use period for a content key (for example, one year after the selling start date of the key, one year after the key is obtained, and so forth). An attribute with respect to such a use period is managed by the content attribute management database 81. The attribute with respect to the use period is set under the control of the key data move controlling portion 83 when the key rewriting portion 88 rewrites right-of-use user information of the key after the movement for the right of use of the content to a user who wants the content is approved.

When the content owner designates one year as the use period of the content after the selling date of the content (for example, the date on which the encryption key is circulated), the key rewriting portion 88 writes the designated limit date to the key and encrypts the resultant key. When the content owner designates one year after the key is obtained as a right-of-use period, the key rewriting portion 88 writes the date one year after the right of use is moved as a limit period to the key and then encrypts the resultant key.

Next, with reference to a flow chart shown in FIGS. 10A and 10B, a process in the case that a selling request for digital data is issued according to the embodiment of the present invention will be described in detail. Due to the drawing limitation, the flow chart is divided into two drawings. At step S11 as the initial step, a selling order is input.

Figure 11:
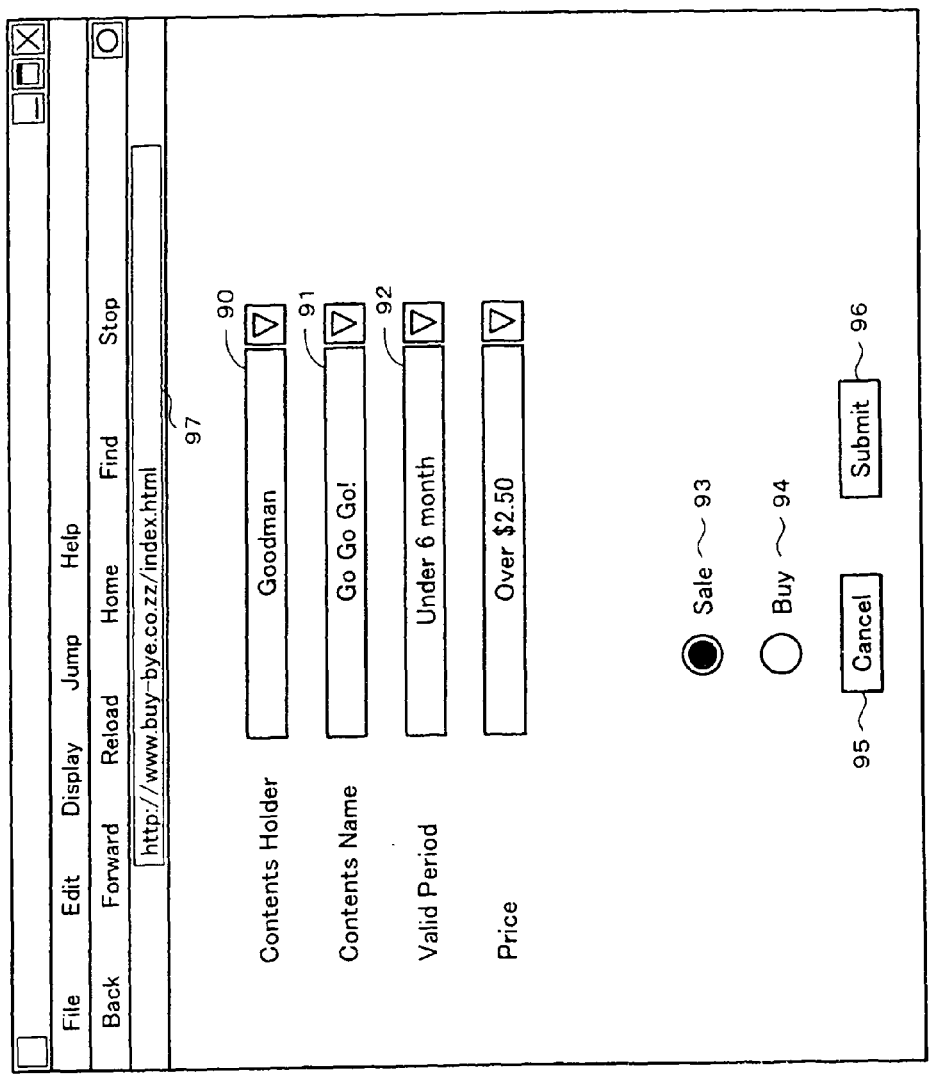
FIG. 11 is a schematic diagram showing a screen displayed on a user terminal side that issues a selling request.

A user who wants to sell a content accesses a home page of the transaction managing portion 2 or the transaction intermediary 5 and inputs a selling order thereon. A screen as shown in FIG. 11 is displayed on a display of a computer of the user. With a content owner display field 90, a content name display field 91, a validation period display field 92, and a price display field, a content to be sold is identified. In addition, a sell button 93, a buy button 94, a cancel button 95, a transmission button 96 are displayed. In this case, since a selling process is performed, the sell button 93 is selected. In addition, an address 97 at which the user accesses the home page of the transaction managing portion 2 or the transaction intermediary 5 is displayed.

When the selling request is received, the transaction permission determining portion 72 references the black list management database 73 (at step S12). The transaction permission determining portion 72 determines whether or not the key for the selling request is on the black list at step S13. When the key for the selling request is on the black list, at step S27, the key stored in the client machine that transmitted the selling request is erased and the process is terminated.

When the determined result represents that the key for the selling request is not on the black list, at step S14, the transaction permission determining portion 72 references the sold key management database 74 and determines whether or not the key for the selling request has been sold. When the determined result represents that the key has not been sold, at step S16, the content of the key is determined.

Figure 10B:
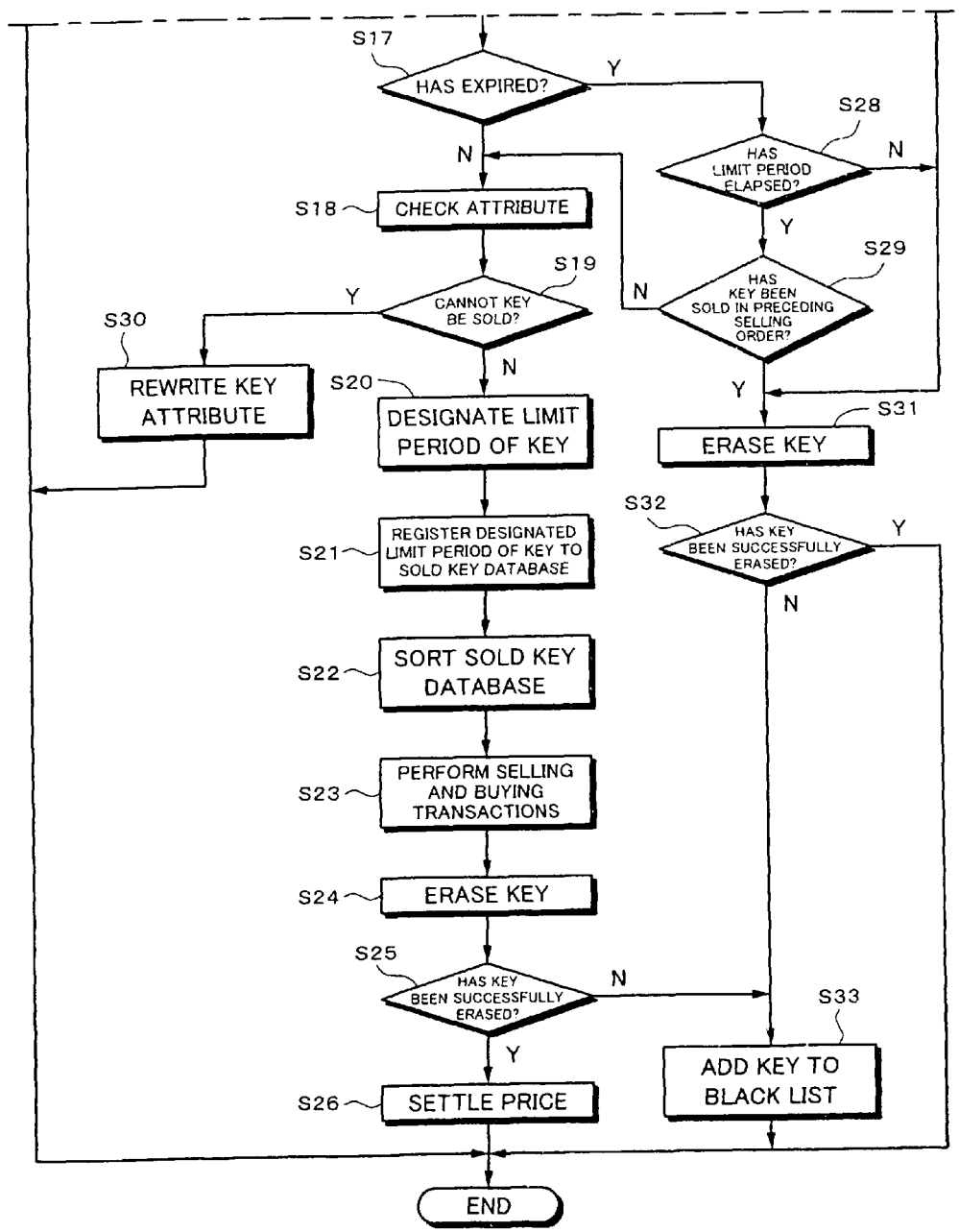

At step S17 shown in FIG. 10B, using the validation period data 67 and the limit period data 68 contained in the encryption key data, it is determined whether or not the key for the selling request has been expired. As to the expiration, there are two cases: the validation period represented by the validation period data 67 that represents the validation period of the encryption key has elapsed and the limit period represented by the limit period data 68 has elapsed.

Figure 12:
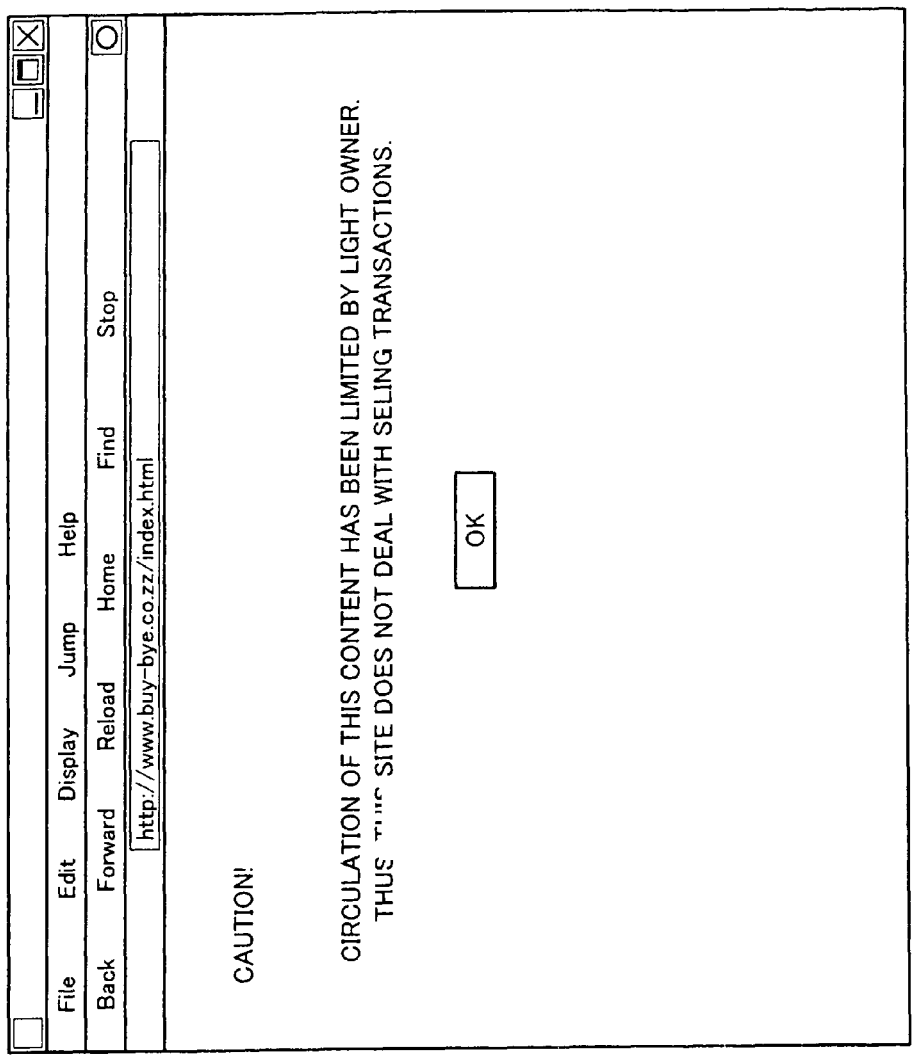
FIG. 12 is a schematic diagram showing a screen displayed on the user terminal side that issues a selling request.

When the determined result at step S17 represents that the validation period has not elapsed, at step S18, the attribute is checked with the other attribute letter 65. Corresponding to the checked attribute, at step S19, it is determined whether the encryption key cannot be sold. When the determined result represents that the encryption key cannot be sold, at step S30, the key attribute is rewritten and the process is completed. In this case, as shown in FIG. 12, a screen that warns the user that the encryption key cannot be sold is displayed.

Figure 13:
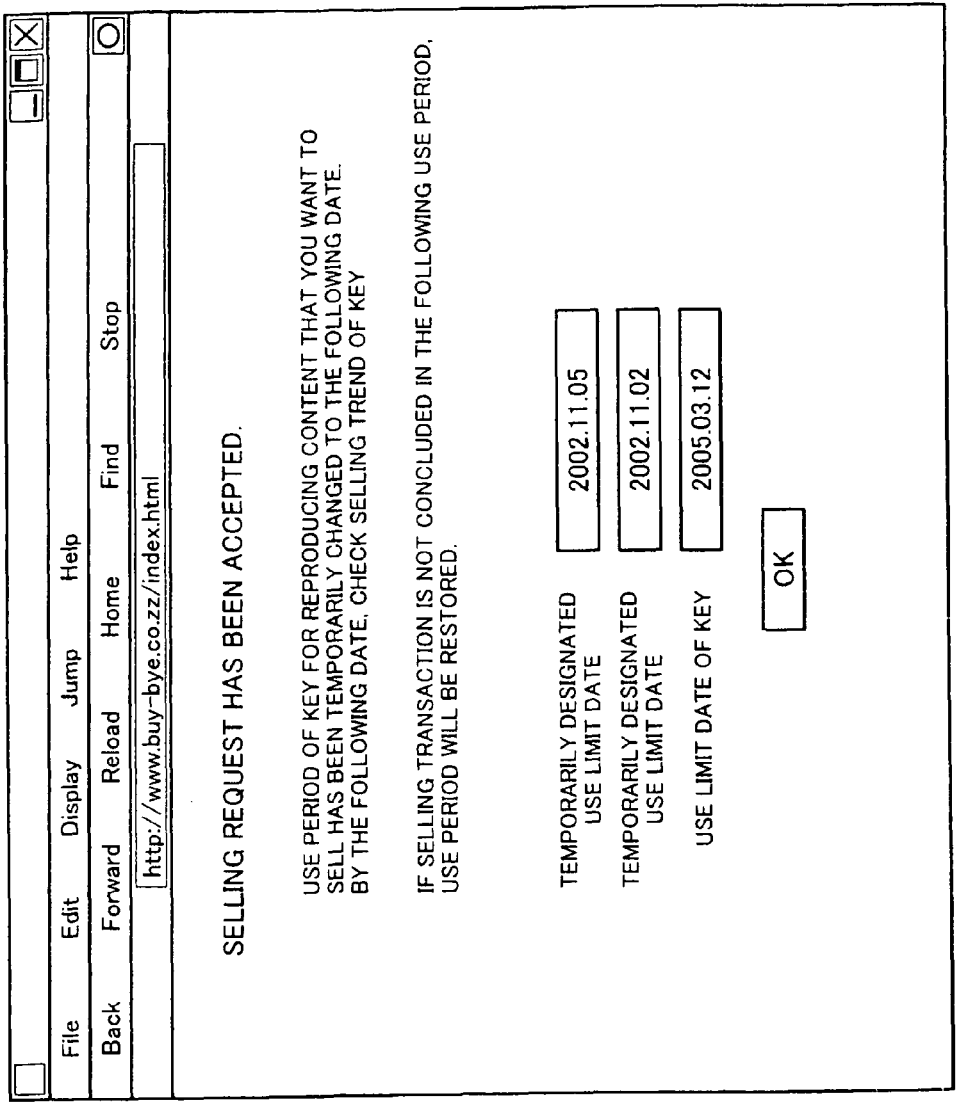
FIG. 13 is a schematic diagram showing a screen displayed on the user terminal side that issues a selling request.

When the determined result at step S19 represents that the encryption key can be sold, at step S20, the limit period for the key represented by the limit period data 68 is designated. Thereafter, the selling request is registered to the selling request database 75 (at step S21). As shown in FIG. 13, a screen representing that the selling order has been accepted is displayed on the display of the computer of the user who issued the selling request. In addition to the use period of the key represented by the validation period data 67, the limit time of the key that has been designated at step S20 and the date on which the use period has been designated are displayed.

Next, the designation of the limit period will be further described. In the state that the same content is temporarily sold and bought by a large number of users (for example, new contents) in a server that forms a market on which an encryption key for a digital content is sold and bought, when a buying request or a selling request is placed on the market, it is easily expected that the transactions are immediately concluded. However, after a period in which many transactions are performed has elapsed (namely, after time Q shown in FIG. 4), a transaction for a request may not be quickly concluded. In other words, it may take several hours to several days until the transaction is concluded. When a transaction is performed in a non-peak period (in which the number of transactions is small), if the computer that stores the encryption key is continuously connected to the network, the network is excessively loaded. In addition, the resource of the server that forms the transaction market is wasted and excessively loaded. In addition, when the computer that stores the encryption key is of hand-held type, the user may use the computer until the trade is concluded in the state that the computer is not connected to the network.

When the limit period is designated, while a selling request for an encryption key is being issued, even if the owner of the encryption key disconnects the computer from the network connected to the server that forms the transaction market, he or she can use the digital content data. In addition, when the result of the transaction is not reflected for a long time, a plurality of royalties exist for each encryption key. However, this period can be shortened. In other words, when the limit period is designated, after a selling request for digital content data is transmitted, the computer that sores the digital content data can be disconnected from the network and used. In addition, a plurality of encryption keys as the right of use of digital content data can be prevented from existing for a predetermined time period.

Figure 3:
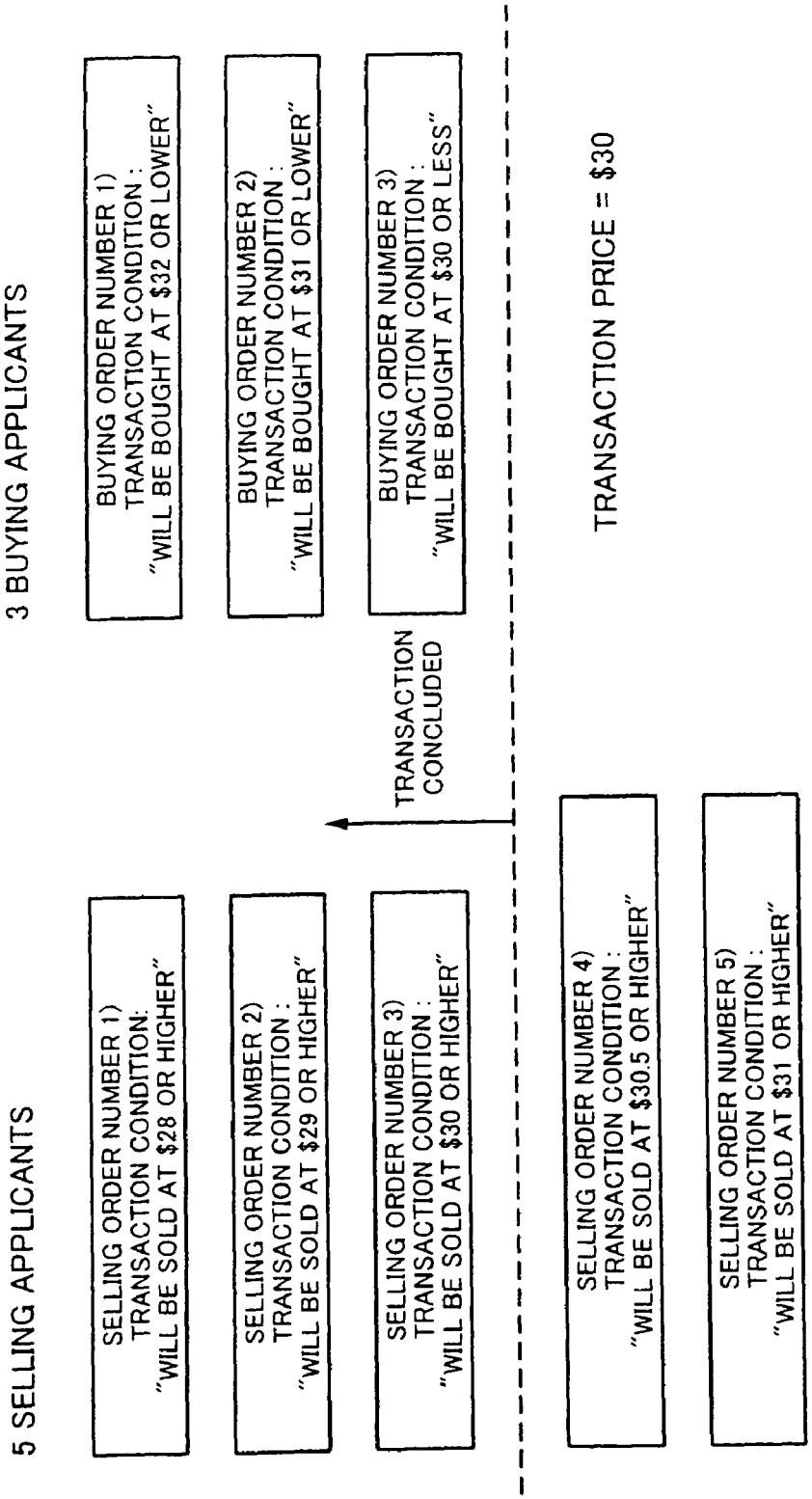
FIG. 3 is schematic diagram for explaining another example of conclusion/unconclusion of selling and buying transactions according to the embodiment of the present invention.

Returning to FIG. 10B, at step S22, the selling request database is sorted so as to perform the process described with reference to FIG. 3. At step S23, the transaction condition determining portion 82 performs selling and buying transactions. When the transactions are concluded, the key erasing portion 78 issues a key erase command. At step S24, the key stored in the client machine that has transmitted the selling request is erased. At step S25, it is determined whether or not the key stored in the client machine that had transmitted the selling request has been successfully erased. When the determined result at step S25 represents that the key stored in the client machine that had transmitted the selling request has been successfully erased, at step S26, the price is settled and the process is completed.

When the determined result at step S17 represents that the validation period has elapsed, at step S28, it is determined whether or not the limit period has elapsed. When the determined result represents that the limit period has not elapsed, since the validation period of the key has elapsed, at step S31, the key stored in the client machine that had transmitted the selling request is erased. It is determined whether or not the key stored in the client machine that had transmitted the selling request has been successfully erased at step S32.

When the determined result at step S32 represents that the key stored in the client machine that had transmitted the selling request has been successfully erased, the process is completed. When the determined results at steps S32 and S25 represent that the key stored in the client machine that had transmitted the selling request has not been successfully erased, the user name of the key is added to the black list management database 73 (at step S33). Thereafter, the process is completed.

When the determined result at step S28 represents that the limit period has elapsed, at step S29, it is determined whether or not the key has been sold in the preceding selling order with reference to the sold key management database 74. When the key has been sold, after step S31 (erasing the key), the above-described operation is performed. When the determined result at step S29 represents that the key has not been sold, the flow advances to step S18. At step S18, the process for checking the attribute is performed. After step S19 (determining whether the key cannot be sold), the above-described process is performed.

Since the limit period can be designated to the encryption key, there is a case that the user who has issued a selling request disconnects the computer that stores the encryption key from the network that is connected to the server that forms the transaction market. The selling request issued before the disconnection of the computer from the network is the preceding selling order. When the computer is connected to the network, the result of the preceding selling order is reflected to the encryption key.

Figure 14:
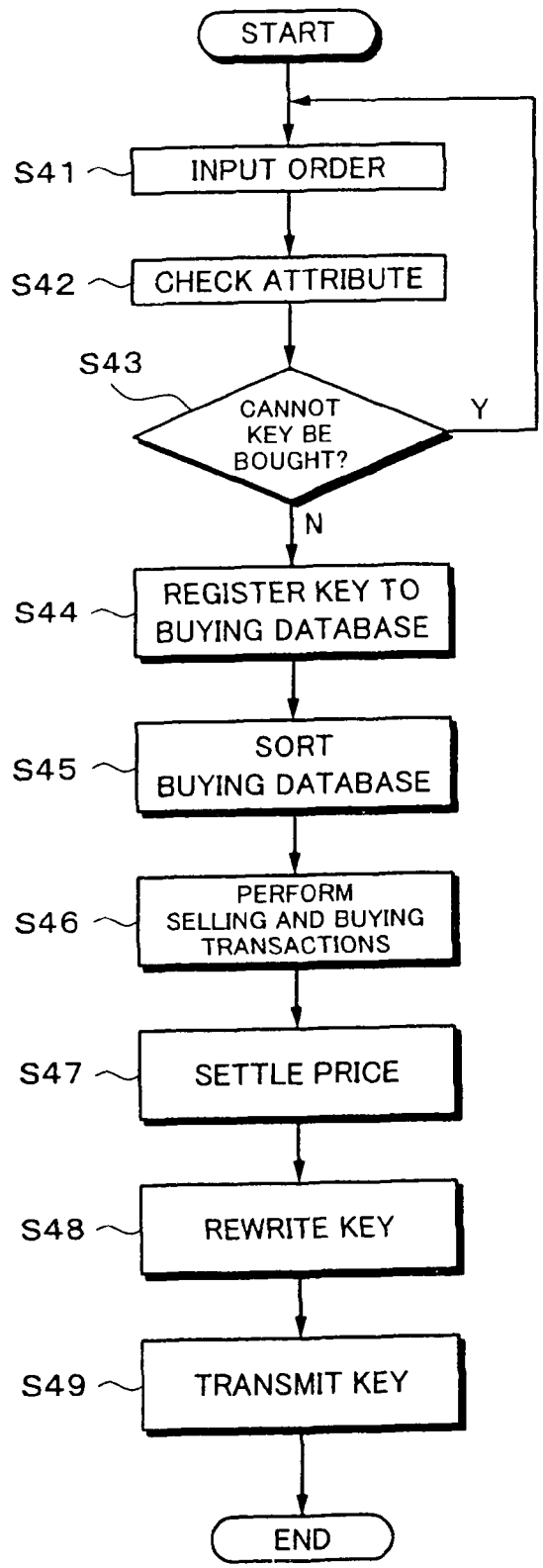
FIG. 14 is a flow chart showing a process performed in the case that a buying request is issued to the server.
Figure 15:
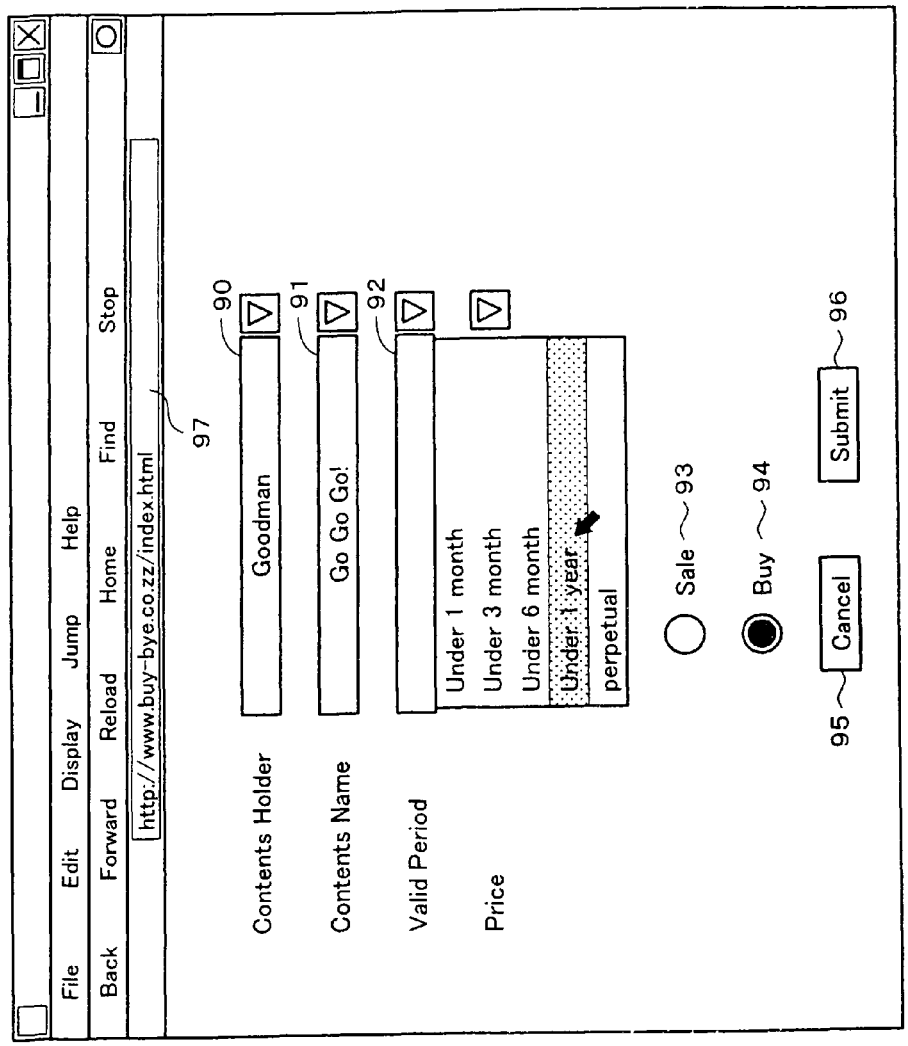
FIG. 15 is a schematic diagram showing a screen displayed on the user terminal side that issues a buying request.

Next, with reference to FIGS. 14 and 15, a process for buying digital data will be described. At step S41 as the initial step, a buying order is issued. A display of a computer of a user who inputs the buying order shows a screen depicted in FIG. 14. With the content owner display field 90, the content name display field 91, the validation period display field 92, and the price display field, a content to be bought is designated. In addition, the sell button 93, the buy button 94, the cancel button 95, and the transmission button 96 are displayed. Since a buying process is performed, the buy button has been selected. In addition, the address 97 at which the user accesses the home page of the transaction managing portion 2 or the transaction intermediary 5 is displayed.

At step S42, the attribute of the content to be bought corresponding to the input buying order is checked with reference to the content attribute management database 81. Corresponding to the checked result, at step S43, it is determined whether or not the content can be bought. When the content cannot be bought, the flow returns to step S41. When the content can be bought, at step S44, the buying order is registered to the buying request database 86.

At step S45, the buying request database 86 is sorted. The transaction condition determining portion 82 determines whether or not the transactions are concluded. At step S46, the transactions are concluded. At step S47, the price is settled. Practically, the key data move controlling portion 83 generates a buying/paying request. At step S48, the key rewriting portion 88 rewrites the key. For example, the key rewriting portion 88 rewrites information of for example key transaction history. At step S49, the key is transmitted to the buyer. Thereafter, the process is completed.

In the above description, the present invention was applied for a conventional communication network such as the Internet. However, the present invention is not limited to such a communication network. In other words, the present invention can be also applied to a broad band information communication network using a CATV network, a wireless communication network using a broadcast satellite or a communication satellite, or a broad band cellular phone network.

The present invention is not limited to the above-described embodiment. Instead, without departing from the scope and sprit of the present invention, various modifications and applications are available.

According to the present invention, digital data can be sold and bought through a communication network using for example the Internet. The number of buying applicants for digital data and the number of selling applicants for digital data are obtained by transmitting and receiving information through the communication network. Corresponding to the obtained number of buying applicants for digital data and the obtained number of selling applicants for digital data, the transaction price can be properly decided. Thus, while the transaction price is properly decided, the digital data can be sold, bought, and resold.

Thus, when the copyright owner controls the circulation number of royalties of digital data, the sales of digital data can be effectively increased. In addition, when the copyright owner sells digital data to a transaction intermediary in the lump, he or she can quickly collect the development cost of the digital data. This point is advantageous especially for a copyright owner who is lack of capital.

In addition, because of the presence of the transaction intermediary, the copyright owner can dedicate to the development of digital data and have a proper consultation with respect to development guideline and so forth therefrom.

In addition, corresponding to the total price of digital data placed on the market, when several percent thereof is paid to the copyright owner, even in the resale market environment, the profit of the copyright owner can be assured.

On the other hand, a user can buy digital data that matches his or her sense of values at his desired price. In addition, a user can freely resell digital data that he bought. Thus, a user can not only use digital data by himself or herself, but get profits by reselling it.

In addition, on the transaction market according to the present invention, since transaction data is publicized on the communication network, the grading of digital data on the market is widely known. Thus, in addition to the enhancement of the business value of the copyright owner, digital data that has been highly evaluated can be quickly placed on the market. Thus, users can have many chances of which they can use digital data with high values.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An auxiliary digital data selling and buying system, comprising:
    a selling processing device for performing a process for selling auxiliary digital data with respect to a process for canceling a limitation of use of digital data;
    a buying processing device for performing a process for buying the auxiliary digital data; and
    a selling and buying processing device for performing a process for receiving a selling request from said selling processing device and a buying request from said buying processing device and for concluding selling and buying transactions;

said selling processing device, said buying processing device, and said selling and buying processing device being connected to each other through a communication network;

said selling processing device including:
storing means for storing the auxiliary digital data,
transmitting means for transmitting, through the communication network, identification information and a selling request of a selling applicant of the auxiliary digital data,
receiving means for receiving a selling notification for the auxiliary digital data that is transmitted from said selling and buying processing device through the communication network,
erasing means for erasing the auxiliary digital data from the storing means, and
controlling means for controlling said transmitting means so that the identification information and the selling request of the selling applicant are transmitted to said selling and buying processing device, and for controlling said erasing means so that the auxiliary data is erased from the storing means when said receiving means has received the selling notification transmitted from said selling and buying processing device through the communication network;

said buying processing device including:
transmitting means for transmitting, through the communication network, identification information and a buying request of a buying applicant of the auxiliary digital data,
receiving means for receiving buying notification of the auxiliary digital data transmitted from said selling and buying processing device through the communication network, and
controlling means for controlling said transmitting means so that the identification information and the buying request of the buying applicant are transmitted to said selling and buying processing device through the communication network; and said selling and buying processing device including:
receiving means for receiving, through the communication network, one or more of the identification information and the selling request of the selling applicant transmitted from said selling processing device and the identification information and the buying request of the buying applicant transmitted from said buying processing device,
storing means for storing management information and the auxiliary digital data, the management information correlating the identification information of the selling applicant and the buying applicant and information that represents the state of ownership of the auxiliary digital data and the digital data,
selling and buying transaction concluding processing means for concluding the selling and buying transactions of the auxiliary digital data corresponding to the identification information and the selling request of the selling applicant that is received by said receiving means from said selling processing device, and corresponding to the identification information and the buying request of the buying applicant that is received by said receiving means from said buying processing device,
transmitting means for transmitting the auxiliary digital data and a selling notification thereof through the communication network, and
controlling means for updating the management information stored in said storing means corresponding to one or more of the identification information of the selling applicant and the identification information of the buying applicant received by said receiving means, for reading the auxiliary digital data to be transmitted from said storing means to the buying applicant, for controlling said transmitting means so that the auxiliary digital data that has been read to said buying processing device and the selling notification are transmitted to said selling processing device when the selling and buying transactions of the auxiliary digital data concluded.

2. The auxiliary digital data selling and buying system as set forth in claim 1, wherein said storing means of said selling and buying processing device further stores the digital data, said transmitting means of said selling and buying processing device transmits the digital data, and said controlling means of said selling and buying processing device reads the digital data to be transmitted from said storing means to the buying applicant and controls said transmitting means so that the digital data that has been read is transmitted to said buying processing device.

3. The auxiliary digital data selling and buying system as set forth in claim 2, wherein said selling and buying processing device performs an encrypting process for the digital data with respect to the auxiliary digital data before said selling and buying processing device transmits the digital data to said buying processing device.

4. The auxiliary digital data selling and buying system as set forth in claim 1, wherein the auxiliary digital data contains information with respect to identification information of a person having a right of use of the digital data corresponding to the auxiliary digital data.

5. The auxiliary digital data selling and buying system as set forth in claim 4, wherein said selling and buying processing device performs a process for rewriting information with respect to identification information of the person having the right of use of the digital data corresponding to the auxiliary digital data before said selling and buying processing device transmits the auxiliary digital data to said buying processing device.

6. The auxiliary digital data selling and buying system as set forth in claim 1, wherein said selling and buying processing device settles concluded selling and buying transactions and generates data with respect to a paying and receiving process corresponding to the settled result.

7. The auxiliary digital data selling and buying system as set forth in claim 6, wherein said selling and buying processing device rewrites asset information of personal information of people concerned with the concluded selling and buying transactions so that the price with respect to the selling and buying transaction is paid and/or received.

8. The auxiliary digital data selling and buying system as set forth in claim 6, wherein a person concerned with selling and buying transactions is a selling applicant of auxiliary digital data corresponding to digital data and to a buying application of auxiliary digital data corresponding to another digital data, and both selling and buying transactions corresponding to a selling request and a buying request of the person are concluded,
said selling and buying processing device calculates a sum of assets transferred in each of the concluded selling and buying transactions as part of data with respect to the paying and receiving process, causes said selling processing device of the person to erase the auxiliary digital data corresponding to the digital data, and transmits the auxiliary digital data corresponding to the other digital data to said buying processing device of the person.

9. The digital data selling and buying transacting system as set forth in claim 8, wherein said selling and buying processing device further rewrites asset information of personal information of the person concerned and corresponding to the sum of the transferred assets so that the price for the selling and buying transactions is paid and/or received.

10. An auxiliary digital data selling and buying method, comprising:

performing a process for selling auxiliary digital data with respect to a process for canceling the limitation of the use of digital data;

performing a process for buying the auxiliary digital data; and performing a process for receiving a selling request and a buying request and for concluding the selling and the buying;

the process for selling, the process for buying, and the process for receiving the selling request and the buying request being performed by transmitting and receiving data through a communication network;

the process for selling including:
 storing the auxiliary digital data,
 transmitting user identification information and a selling request of a selling applicant of the auxiliary digital data through the communication network,
 receiving a selling notification for the auxiliary digital data transmitted from the selling and buying processing step through the communication network,
 erasing the stored auxiliary digital data,
 controlling the transmitting step so that the identification information and the selling request of the selling applicant are transmitted, and
 controlling the erasing step so that the stored auxiliary data is erased when the receiving step has received the selling notification transmitted through the communication network;

the process for buying including:
 transmitting identification information and a buying request of a buying applicant of the auxiliary digital data through the communication network,
 receiving a buying notification of the auxiliary digital data transmitted through the communication network, and
 controlling the transmitting step so that the identification information and the buying request of the buying applicant are transmitted through the communication network; and the process for receiving the selling request and the buying request including:
 receiving one or more of the (i) identification information and the selling request of the selling applicant through the communication network and (ii) the identification information and the buying request of the buying applicant through the communication network,
 storing management information and the auxiliary digital data, the management information correlating the identification information of the buying applicant and the selling applicant and information that represents the state of ownership of the auxiliary digital data and the digital data,
 concluding the selling and buying of the auxiliary digital data corresponding to the identification information and the selling request of the selling applicant and corresponding to the identification information and the buying request of the buying applicant,
 transmitting the auxiliary digital data and a selling notification thereof through the communication network,
 updating the stored user management information corresponding to one or more of the identification information of the selling applicant and the identification information of the buying applicant,
 reading the auxiliary digital data to be transmitted to the buying applicant, and
 controlling the transmitting step so that the read auxiliary digital data and the selling notification are transmitted when the selling and buying transactions of the auxiliary digital data are concluded.

* * * * *